US008620298B2

(12) United States Patent
Page et al.

(10) Patent No.: US 8,620,298 B2
(45) Date of Patent: Dec. 31, 2013

(54) CAPACITY MANAGEMENT OF AN ASYNCHRONOUS TRANSFER MODE INTERFACE IN A WIRELESS COMMUNICATION INFRASTRUCTURE

(71) Applicant: AT&T Intellectual Property I, L.P., Reno, NV (US)

(72) Inventors: Leslie Page, Elk Grove Village, IL (US); Tim Erlandson, Plainfield, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 25 days.

(21) Appl. No.: 13/657,463

(22) Filed: Oct. 22, 2012

(65) Prior Publication Data

US 2013/0040628 A1 Feb. 14, 2013

Related U.S. Application Data

(63) Continuation of application No. 12/576,059, filed on Oct. 8, 2009, now Pat. No. 8,306,517.

(51) Int. Cl.
*H04W 76/00* (2009.01)

(52) U.S. Cl.
USPC .................................. 455/418; 455/422.1

(58) Field of Classification Search
USPC ............... 455/418, 422.1; 370/331, 352, 356
See application file for complete search history.

(56) References Cited

U.S. PATENT DOCUMENTS

| | | | |
|---|---|---|---|
| 6,760,335 | B1 | 7/2004 | Andersson et al. |
| 6,996,126 | B2 | 2/2006 | Deml et al. |
| 2009/0011754 | A1 | 1/2009 | Chinnapareddy et al. |
| 2009/0247141 | A1* | 10/2009 | Vale .............................. 455/418 |

OTHER PUBLICATIONS

A. Samhat & T. Chahed, "IP versus AAL2 for transport in the UMTS radio access network", GET/Institut National des Te'le'communications, 9 Rue Charles Fourier, 91011 Evry cedex, France, Received Mar. 11, 2004; revised Sep. 20, 2004; accepted Sep. 28, 2004, Available online Oct. 21, 2004, 8 pages.

Ana-Belén García, et al., "ATM Transport Between UMTS Base Stations and Controllers: Supporting Topology and Dimensioning Decisions", Dept. of Telematics—Technical University of Madrid (DIT-UPM), Ciudad Universitaria s/n, 28040 Madrid, Spain, Sep. 5-8, 2004. 5 pages.

Nikos H. Loukas, et al., "Transport Performance Evaluation of an ATM-based UMTS Access Network", University of Athens, Department of Informatics, Communication Networks Laboratory, Oct. 12-16, 1997. 5 pages.

* cited by examiner

*Primary Examiner* — Sam Bhattacharya
(74) *Attorney, Agent, or Firm* — Turocy & Watson, LLP

(57) ABSTRACT

Methods and apparatus that effectively manage capacity of a wireless-based communication infrastructure are presented herein. An evaluation component can generate configuration data associated with a base station of a cellular wireless network. Further, a radio network controller component can determine capacity of a physical port coupled between a radio network controller and the base station. The radio network controller component can configure the radio network controller to utilize an increase in capacity of the physical port based on the determined capacity of the physical port. A base station component can configure the base station to utilize the increase in capacity of the physical port based on the configuration data generated by the evaluation component.

20 Claims, 27 Drawing Sheets

CAPACITY MANAGEMENT OF AN ASYNCHRONOUS TRANSFER MODE INTERFACE IN A WIRELESS COMMUNICATION INFRASTRUCTURE

CROSS-REFERENCE TO RELATED APPLICATION

This patent application is a continuation of U.S. patent application Ser. No. 12/576,059 filed Oct. 8, 2009, and entitled "CAPACITY MANAGEMENT OF AN ASYNCHRONOUS TRANSFER MODE INTERFACE IN A WIRELESS COMMUNICATION INFRASTRUCTURE," the entirety of which is incorporated by reference herein.

TECHNICAL FIELD

This disclosure relates generally to capacity management of an asynchronous transfer mode interface in a wireless communication infrastructure.

BACKGROUND

Increased capability of various wireless communication devices, e.g., smartphones connected to the internet, can burden available bandwidth between a local wireless communications cite, e.g., cellular base station, and an associated core network. For example, bandwidth constraints of a wired infrastructure between the cellular base station and core network can degrade the performance of affected smartphones when multiple smartphone customers demand bandwidth intensive information at the same time.

To improve wireless customer experiences, wireless providers can increase the bandwidth of the wired infrastructure by adding communications pipes, e.g., T1 lines, fiber optic cable, etc., between the base station and core network. For example, each additional T1 line can increase the bandwidth of the wired infrastructure by approximately 1.5 Megabits/second. Utilizing this increased bandwidth, however, can be cumbersome and costly due to manual programming of components within an associated network. Moreover, because technology can be distinct between base stations, such programming can be error prone, inconsistent, and time-consuming The above-described deficiencies of today's wireless communication networks and related technologies are merely intended to provide an overview of some of the problems of conventional systems, and are not intended to be exhaustive. Other problems with the state of the art, and corresponding benefits of some of the various non-limiting embodiments described herein, may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
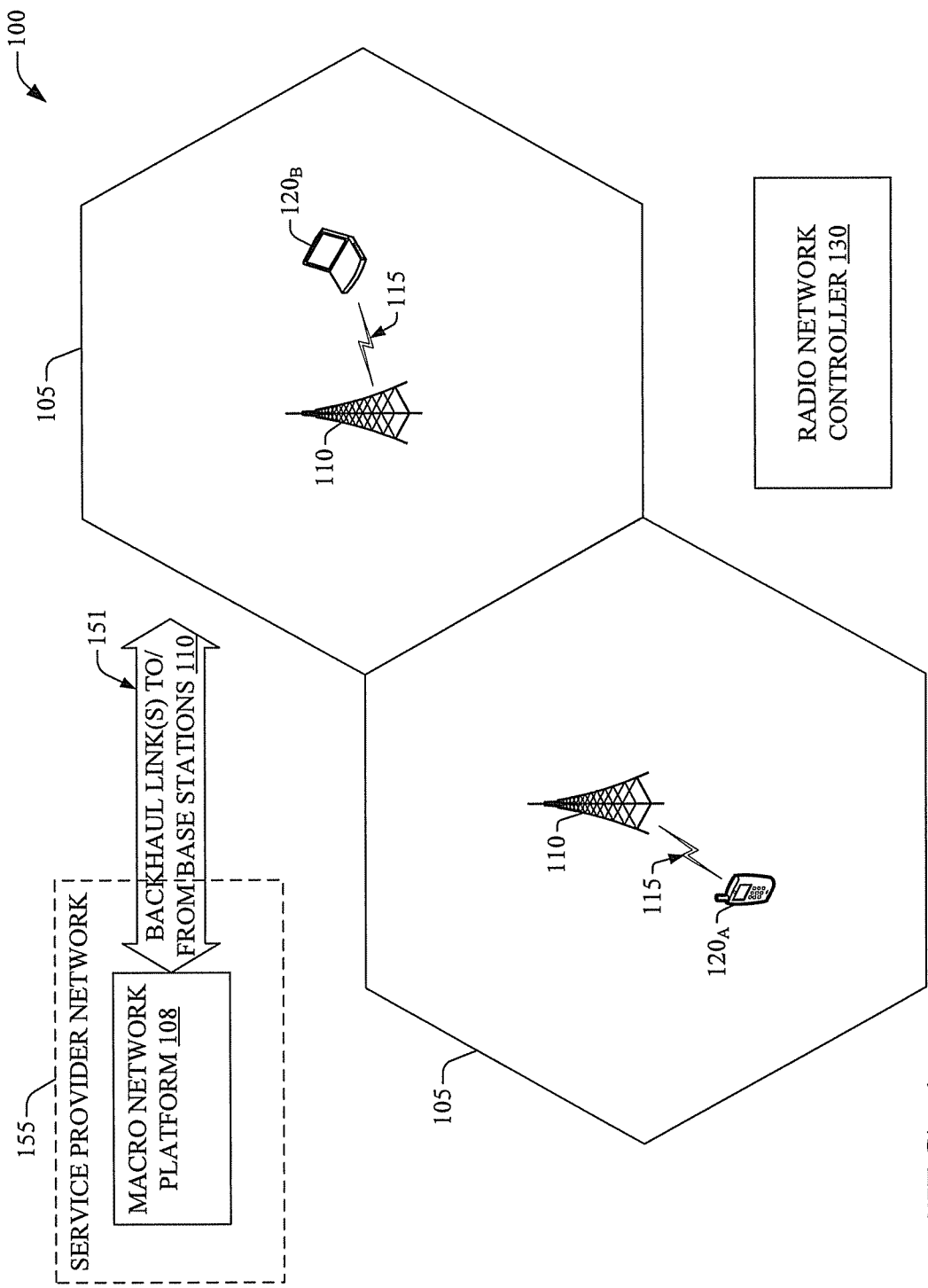
FIG. 1 illustrates a wireless environment that includes macro cells and base stations for wireless coverage, in accordance with an embodiment.

Various non-limiting embodiments of methods and apparatus are provided for managing capacity in an asynchronous transfer mode interface within a wireless communication infrastructure.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. Furthermore, the particular features, structures, or characteristics may be combined in any suitable manner in one or more embodiments.

As utilized herein, terms "component," "system," "platform," "node," "layer," "selector," "interface," and the like are intended to refer to a computer-related entity, hardware, software (e.g., in execution), and/or firmware. For example, a component can be a process running on a processor, a processor, an object, an executable, a program, a storage device, and/or a computer. By way of illustration, an application running on a server and the server can be a component. One or more components can reside within a process and a component can be localized on one computer and/or distributed between two or more computers.

Further, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software application or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, via evaluation component 310 (described below), to automatically generate configuration data associated with a base station of cellular wireless network. In another example, the artificial intelligence system can be used, via radio controller component 320 (described below), to automatically determine capacity of a physical port coupled between a radio network controller (RNC) and the base station; and to configure the RNC to utilize an increase in capacity of the physical port based on the determined capacity of the physical port. In yet another example, the artificial intelligence system can automatically configure the base station to utilize the increase in capacity of the physical port via base station component 330 (described below). Moreover, the artificial intelligence system can be utilized under processes 2100, 2200, and 2300, to automatically: create configuration information; determine whether a physical interface includes unused bandwidth; and configure a cellular wireless network to utilize the unused bandwidth, respectively.

As used herein, the term "infer" or "inference" refers generally to the process of reasoning about or inferring states of the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example. Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc™ (BD); smart card(s), flash memory device(s) (e.g., card, stick, key drive).

Moreover, terms like "user equipment" (UE), "mobile station," "mobile subscriber station," "access terminal," "terminal," "handset," "appliance," "machine", and similar terminology refer to a wireless device utilized by a subscriber or user of a wireless communication service to receive and/or convey data associated with voice, video, sound, and/or substantially any data-stream or signaling-stream. Further, the foregoing terms are utilized interchangeably in the subject specification and related drawings. Likewise, the terms "local wireless communications cite," "access point" (AP), "base station," "Node B," "evolved Node B," "home Node B" (HNB), "home access point" (HAP), and the like are utilized interchangeably in the subject specification and drawings and refer to a wireless network component or apparatus that sends and/or receives data associated with voice, video, sound, and/or substantially any data-stream or signaling-stream between a set of subscriber stations—unless context warrants particular distinction(s) among the terms. Further, the data and signaling streams can be packetized or frame-based flows.

Furthermore, the terms "user," "subscriber," "customer," "consumer," "agent,", "owner," and the like are employed interchangeably throughout the subject specification and related drawings, unless context warrants particular distinction(s) among the terms. It should be appreciated that such terms can refer to human entities, or automated components supported through artificial intelligence, e.g., a capacity to make inference based on complex mathematical formalisms, that can provide simulated vision, sound recognition, decision making, etc. Also, the terms "local wireless communications cite," "access point," "base station," and the like are utilized interchangeably throughout the subject specification, and refer to devices that can receive and transmit signal(s) from and to wireless devices through one or more antennas. In addition, the terms "wireless network" and "network" are used interchangeable in the subject application, unless context warrants particular distinction(s) among the terms.

The subject disclosure relates to methods and apparatus that effectively manage capacity of a wireless-based communication infrastructure. Conventional techniques that account for increased bandwidth of an asynchronous transfer mode (ATM) interface between a wireless base station and components of an associated core network can be inefficient and prone to error. Compared to conventional techniques, various methods and apparatus described herein efficiently configure an ATM interface between a base station and radio network controller (RNC) to utilize increased physical capacity of the ATM interface.

Aspects, features, or advantages of the disclosed subject matter can be exploited in substantially any wireless telecommunication or radio technology, e.g., wireless fidelity (Wi-Fi), Worldwide Interoperability for Microwave Access (WiMAX); Enhanced General Packet Radio Service (Enhanced GPRS); 3GPP Long Term Evolution (LTE); Third Generation Partnership Project 2 (3GPP2) Ultra Mobile Broadband (UMB); 3GPP UMTS; High Speed Packet Access (HSPA); High Speed Downlink Packet Access (HSDPA); High Speed Uplink Packet Access (HSUPA), LTE Advanced, etc.

Additionally, substantially all aspects of the disclosed subject matter can include legacy telecommunication technologies, e.g., plain old telephone service (POTS). It should be appreciated that selections of radio technology include second generation (2G), third generation (3G), and fourth generation (4G) evolution of the radio technology; however, such selections are not intended as a limitation of the disclosed subject matter and related aspects thereof. In addition, the aspects, features, or advantages of the disclosed subject matter can be exploited in disparate electromagnetic frequency bands.

In one non-limiting aspect, methods and apparatus are provided for managing capacity in an asynchronous transfer mode interface within a wireless network. The wireless network includes a local wireless communications cite (or base station), which can use a licensed radio spectrum operated and controlled by a wireless service provider. User equipment (UE) operated by a subscriber within a coverage area typically communicates with a core network via the base station. The UE can register with the base station and communication, e.g., voice traffic, data traffic, can be routed to the subscriber through the base station utilizing the licensed radio spectrum. The base station can employ a backhaul network, e.g., broadband wired or wireless network backbone, to route packet communication, e.g., voice traffic, data traffic, data, to the core network.

FIG. 1 illustrates a wireless environment 100 that includes macro cells 105 and base stations 110 for wireless coverage, in accordance with an embodiment. Each macro cell 105 represents a "macro" cell coverage area, and is served by base station 110. It should be appreciated that macro cells 105 are illustrated as hexagons; however, macro cells 105 can adopt other geometries generally dictated by a deployment or floor plan of the macro cell coverage area, or covered geographic area, e.g., metropolitan statistical area (MSA), rural statistical area (RSA), etc. Macro cell coverage is generally intended to serve mobile wireless devices, e.g., UE $120_A$, UE $120_B$, in outdoor locations. An over-the-air wireless link 115 provides the macro coverage, and wireless link 115 comprises a downlink (DL) and an uplink (UL) (both not shown) that can utilize a predetermined band of radio frequency (RF) spectrum associated with a Third Generation Partnership Project (3GPP) Universal Mobile Telecommunication System (UMTS), for example. Accordingly, UE $120_A$ can be a 3GPP UMTS mobile phone, while $120_B$ can be a remote computing device with 3GPP UMTS capabilities.

Base station 110—including associated electronics, circuitry and/or components—and wireless link 115 form a radio access network (RAN). In addition, base station 110 communicates with macro network platform 108 via backhaul link(s) 151. Macro network platform 108 represents a core network comprising one or more cellular wireless technologies, e.g., 3GPP UMTS, Global System for Mobile Communication (GSM). In one aspect, macro network platform 108 controls a set of base stations 110 that serve either respective cells or a number of sectors within such cells. Macro network platform 108 can also communicate with other base stations (not shown) that serve other cells (not shown). Backhaul link(s) 151 can include a wired backbone link, e.g., optical fiber backbone, twisted-pair line, T1/E1 phone line, synchronous or asynchronous digital subscriber line (DSL), asymmetric DSL (ADSL), coaxial cable, etc. Moreover, backhaul links(s) 151 can link disparate base stations 110 based on macro network platform 108.

Packet communication, e.g., voice traffic, data traffic, is typically paged/routed through a broadband wired network backbone (or backhaul network) utilizing, e.g., optical fiber backbone, twisted-pair line, T1/E1 phone line, synchronous or asynchronous digital subscriber line (DSL), asymmetric DSL (ADSL), coaxial cable, etc. To this end, base station 110 is typically connected to the backhaul network, e.g., service provider network 155, via a broadband modem (not shown) and backhaul link(s) 151. Through backhaul link(s) 151, base station 110 can handle substantially any quality of service (QoS) for heterogeneous packetized traffic, e.g., various multiple packet flows.

Base station 110 can integrate into an existing network, e.g., 3GPP Core Network, via various interfaces, for example: via an Iub interface (not shown) between a radio network controller (RNC) 130 and base station 110; via an interface (not shown) between RNC 130 and a Circuit Switched Core Network (CS-CN); via an interface (not shown) between RNC 130 and an Iu-CS interface; via an interface (not shown) between RNC 130 and a Packet Switched Core Network (or Iu-PS interface); via an interface (not shown) between a Serving General Packet Radio Service Support Node (SGSN) and a public data network (PDN) (or Gi interface); via an interface (not shown) between SGSN and other SGSNs (or Gn interface).

Asynchronous Transfer Mode (ATM) can be used for 3GPP Core Network data transmissions via the Iub interface between RNC 130 and base station 110. ATM is a packet switching protocol that encodes data into fixed-size cells, and differs from other packet-switched network technology that uses variable sized packets, e.g., Internet Protocol (IP) or Ethernet. By utilizing a connection-oriented model, ATM establishes a virtual circuit (or connection) between endpoints before exchanging data between the endpoints. Each endpoint should be configured via RNC 130 to support: a type of service between the endpoints; traffic parameters of data flow between the endpoints; and QoS parameters of the data flow. ATM supports different types of services, e.g., voice, video, data, on a network via ATM Adaptation Layers (AAL), e.g., AAL2 can be used for variable bit rate (VBR) services (e.g., voice traffic), AAL5 can be used for data transfer. An AAL can be negotiated or configured at endpoints on a per-virtual-connection basis via RNC 130. A traffic descriptor can be used to describe service(s) or traffic characteristic(s) of a virtual circuit established between the endpoints.

A virtual path is a bundle of virtual circuits that have the same endpoints. The virtual path identifies a particular physical port, or physical transmission link, which includes, for example, T1 or E1 cable connected between two endpoints (or nodes). The physical port can form an Iub interface related to an ATM packet switching protocol. The line (or data) rate of each T1 cable included in the physical port can be approximately 1.544 Mbits/second, while the line rate of an E1 link included in the physical port can be approximately 2.048 Mbits/second. A virtual circuit identifies a sub-bandwidth in the physical port; available physical bandwidth on a particular virtual path can be partitioned among several virtual circuits.

Inverse Multiplexing for ATM (IMA) can be used to increase available bandwidth of a virtual path by grouping or bundling T1 or E1 cables together to form an IMA Group—the resulting line rate of the virtual path approximately a multiple of the line rate of a T1 and/or E1 cable. Accordingly, the methods and apparatus of the subject disclosure can create consistency, reduce errors, and effectively update an ATM interface coupled to a base station by intelligently configuring the base station and associated components when physical transmission link(s) are added to the ATM interface.

Figure 2:
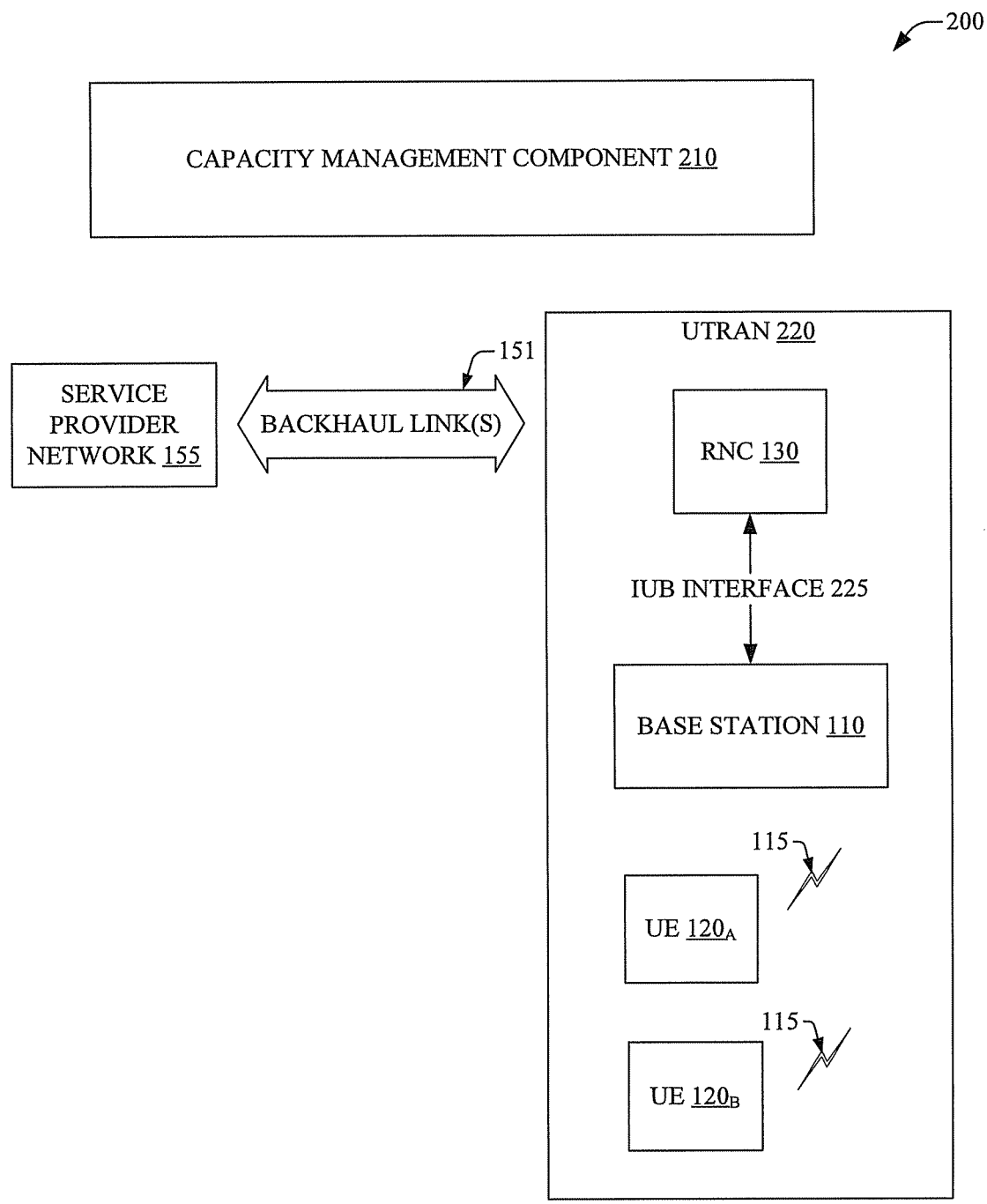
FIG. 2 illustrates a demonstrative system for effectively managing capacity of a wireless-based communication infrastructure, in accordance with an embodiment.

FIG. 2 illustrates a demonstrative system 200 for effectively managing capacity of a wireless-based communication infrastructure, in accordance with an embodiment. System 200 and the systems described below can comprise one or more base stations 110 coupled to RNC 130 to form a UMTS Terrestrial Radio Access Network (UTRAN) 220. UTRAN 220 can be coupled to a core network, e.g., service provider network 155, via one or more backhaul links 151 (see above) to facilitate wireless communication and data transfer to one or more wireless devices, e.g., UE $120_A$, UE $120_B$, in accordance with the disclosed subject matter. At least one base station 110 can connect to RNC 130 via an Iub interface, e.g., Iub interface 225, which can comprises an ATM packet switching protocol.

System 200 and the systems and processes explained below may constitute machine-executable instructions embodied within a machine, e.g., computer, readable medium, which when executed by a machine will cause the machine to perform the operations described. Additionally, the systems and processes may be embodied within hardware, such as an application specific integrated circuit (ASIC) or the like. The order in which some or all of the process blocks appear in each process should not be deemed limiting. Rather, it should be understood by a person of ordinary skill in the art having the benefit of the instant disclosure that some of the process blocks may be executed in a variety of orders not illustrated.

As illustrated by FIG. 2, system 200 includes capacity management component 210. Capacity management component 210 can automate configuration of base station 110 and RNC 130 when physical transmission link(s) are added to an interface between a radio network controller and a base station, e.g., Iub interface 225. Conventional technology can account for physical changes in an Iub interface by way of manual, tedious, operator interface with disparate UTRAN and/or base station configurations. For example, cellular cite operators/technicians should possess intimate knowledge about a configuration of a particular base station to affect use of additional T1 lines coupled to the cellular site, e.g., by manually modifying/debugging scripts associated with programming components of the cellular site and/or associated components. Unlike conventional systems, capacity management component 210 can reduce errors caused by manual configuration of UTRAN elements by effectively configuring the UTRAN elements to account for additional capacity in associated Iub interface(s).

It should be appreciated that capacity management component 210 can be located/included within any component, e.g., hardware, software, etc., of UTRAN 220, e.g., base station 110, RNC 130. Also, it should be appreciated that capacity management component 210 can be located/included within any component of a UMTS core network, e.g. service provider network 155. For example, capacity management component 210 can be located/included within any component of a 3GPP network. Moreover, it should be appreciated that features and advantages of the subject innovation can be implemented in microcells, picocells, femtocells, or the like, wherein base station 110 can be embodied in an access point.

Figure 3:
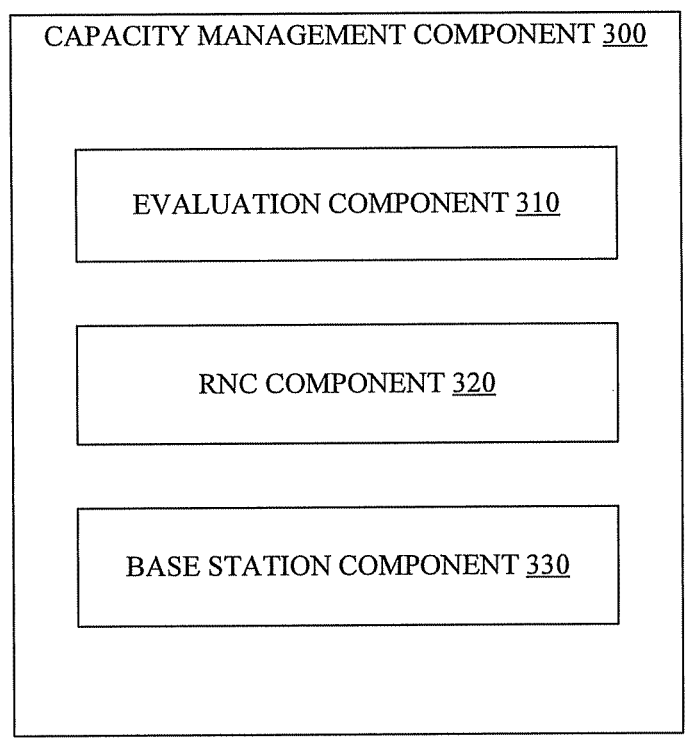
FIG. 3 illustrates a capacity management component for effectively managing capacity of a wireless-based communication infrastructure, in accordance with an embodiment.

FIG. 3 illustrates a capacity management component 300 for effectively managing capacity of a wireless-based communication infrastructure, in accordance with an embodiment. Capacity management component 300 includes an evaluation component 310, an RNC component 320, and a base station component 330. Evaluation component 310 can generate configuration data associated with a base station, e.g., base station 110, of a cellular wireless network, e.g., system 200. For example, the configuration data can include hardware specific information associated with ATM line cards coupled to T1 cable and/or E1 links of a physical transmission link connected to the base station. RNC component 320 can determine capacity, e.g., bandwidth, of the physical transmission link (or physical port) that forms an Iub interface of an ATM packet switching protocol. The capacity of the physical port can be determined by aggregating a data (or line) rate of each T1 cable (or E1 link) included in the physical port. For example, the resulting bandwidth can be a multiple of a T1 line rate of approximately 1.544 Mbits/second, or a multiple of an E1 link line rate of approximately 2.048 Mbits/second.

The RNC component 320 can further configure an RNC coupled to the Iub interface to utilize unused T1 and/or E1 bandwidth based on the determined capacity of the physical port. For example, RNC component 320 can confirm whether T1 cable and/or E1 links were added to a physical transmission link, e.g., to increase capacity of an associated physical port. If T1 cable and/or E1 links of the Iub interface are unused, RNC component 320 can configure the RNC to utilize the increased capacity via the ATM packet switching protocol. In addition, base station component 330 can configure the base station to utilize the increased capacity of the physical port based on the configuration data generated by evaluation component 310. For example, base station component can program ATM line cards to utilize unused T1 cable and/or E1 links coupled to the ATM line cards.

Figure 4:
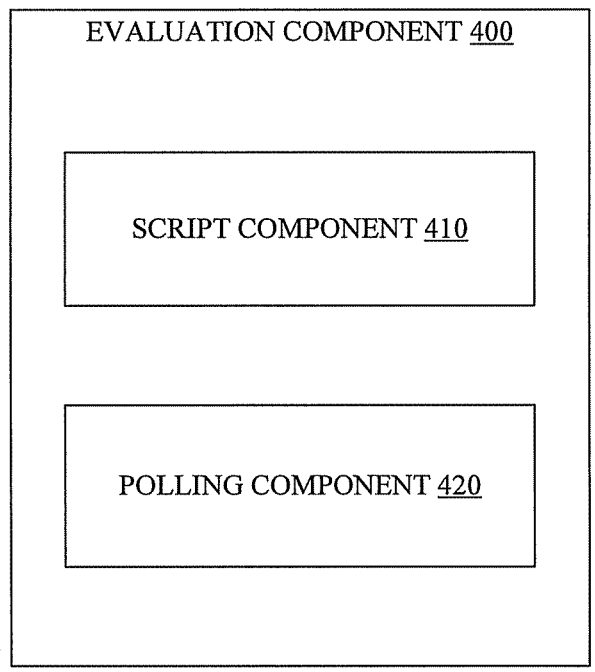
FIG. 4 illustrates an evaluation component, in accordance with an embodiment.

Now referring to FIG. 4, an evaluation component 400 is illustrated, in accordance with an embodiment. Evaluation component 400 can generate configuration data associated with a base station by utilizing a script component 410 and polling component 420. Script component 410 can create one or more scripts based on received data, e.g., data associated with one or more base stations of a UTRAN, e.g., UTRAN 220. Each script comprises a programming language that can control one or more software applications. Such applications can be used to obtain information about various components of the UTRAN, and/or control various devices located within the UTRAN to affect ATM packet switching functions.

For example, script component 410 can receive a data table that at least maps, for at least one RNC of the UTRAN, an associated Iub name, base station identification number, and ATM-based physical port number. Script component 410 can use this mapping information to create unique scripts for at least one RNC. Evaluation component 400 can subsequently execute the script(s) to gather data, e.g., concerning available bandwidth of at least one Iub of a UTRAN. To this end, polling component 420 can poll data associated with at least one base station of the UTRAN based on the created scripts tailored for the at least one base station. The polled data can describe current bandwidth of an Iub interface coupled to the base station, and information concerning virtual path(s) and circuit(s) associated with the Iub interface. Further, polling component 420 can generate configuration data of the at least one base station of the UTRAN based on the polled data.

Figure 5:
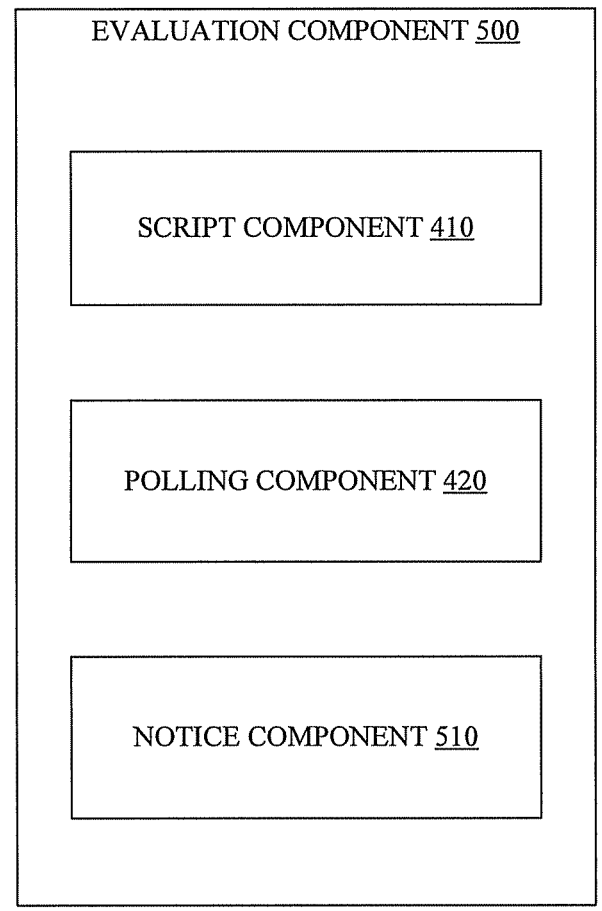
FIG. 5 illustrates another evaluation component, in accordance with an embodiment.

FIG. 5 illustrates another evaluation component 500, in accordance with an embodiment. Evaluation component 500 includes a notice component 510 that can identify whether capacity of the physical port was modified within a predetermined period of time. For example, notice component 510 can identify in the configuration data, e.g., via marking(s) and/or highlight(s), that additional T1 cable and/or E1 links were added to a physical port associated with a base station. The predetermined period of time can be, for example, a calendar date, or a period between two days.

Further, notice component 510 can identify whether the base station was configured within the predetermined period of time. For example, notice component 510 can identify in the configuration data whether hardware and/or software affecting one or more ATM line cards at the base station was added and/or modified to account for additional T1 cable and/or E1 links. Accordingly, in one embodiment, radio network component 700 (discussed below) can configure a radio network controller to utilize an increase in capacity of the physical port when notice component 510 determines that an associated base station was not configured within a predetermined period of time after the physical port was modified. Moreover, in another embodiment, base station component 1200 can configure the base station based on, at least in part, the identified configuration.

Figure 6:
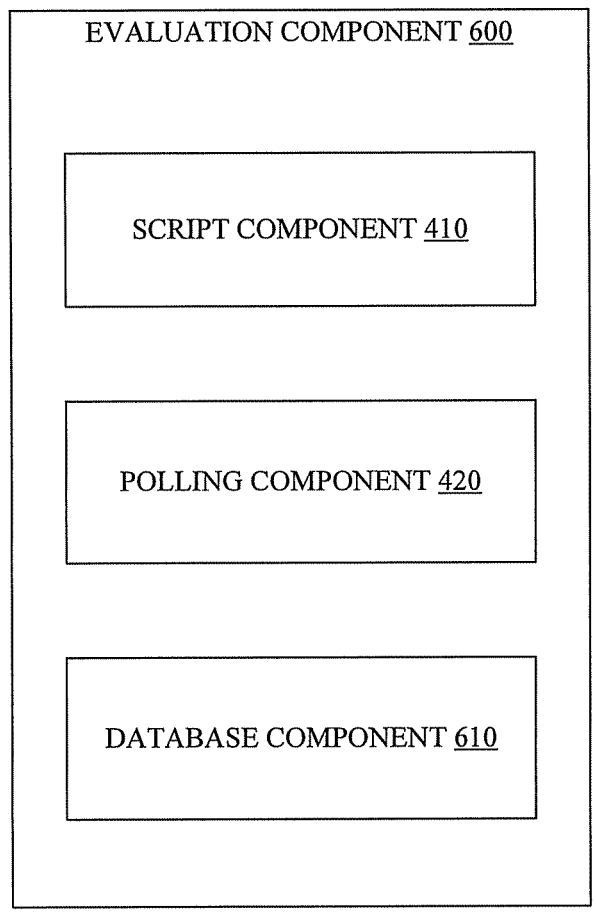
FIG. 6. illustrates yet another evaluation component, in accordance with an embodiment.

FIG. 6 illustrates yet another evaluation component 600, in accordance with an embodiment. Evaluation component 600 includes a database component 610 that can store configuration data—generated by polling component 420—in a data store (not shown). The data store can comprise any removable/non-removable storage medium. Base station component 330 can configure at least one base station of a UTRAN to utilize unused T1 and/or E1 bandwidth, e.g., of a physical port coupled to the base station, based on the stored configuration data. For example, base station component 330 can use the stored configuration data to program ATM line cards located at the base station.

Figure 7:
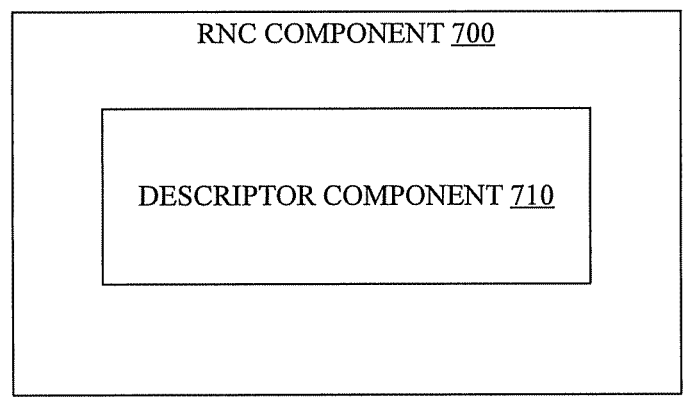
FIG. 7 illustrates a radio network controller (RNC) component, in accordance with an embodiment.

Now referring to FIG. 7, a radio network controller (RNC) component 700 is illustrated, in accordance with an embodiment. RNC component 700 includes a descriptor component 710 that can build one or more descriptors to define traffic characteristics of a virtual path, e.g., in order to account for an increase in capacity of an associated physical port. The virtual path can include one or more virtual circuits according to the ATM packet switching protocol. Available bandwidth of the virtual path can be partitioned among the one or more virtual circuits based on a number of T1 cable and/or E1 links connected between endpoints of the physical port.

In one aspect, RNC component 700 can confirm whether T1 cable and/or E1 links were added to a physical port (or transmission link) associated with an RNC, and/or whether T1 cable and/or E1 links of the physical port are unused. Upon confirmation of additional and/or unused capacity, RNC component 700 can configure the RNC to utilize the additional and/or unused capacity by building one or more descriptors. In one aspect, descriptor component 710 can build at least one of a traffic descriptor, a class of service descriptor, or a virtual path descriptor. A traffic descriptor can be used to describe service(s) or traffic characteristic(s) of a virtual circuit established between associated endpoints. A class of service descriptor can be used to describe QoS parameters of data flow between endpoints. A virtual path descriptor can be used to describe characteristics of a virtual path, e.g., size of the virtual path. For example, descriptor component 710 can build a virtual path descriptor to account for an increase in capacity of virtual circuits associated with the virtual path.

Figure 8:
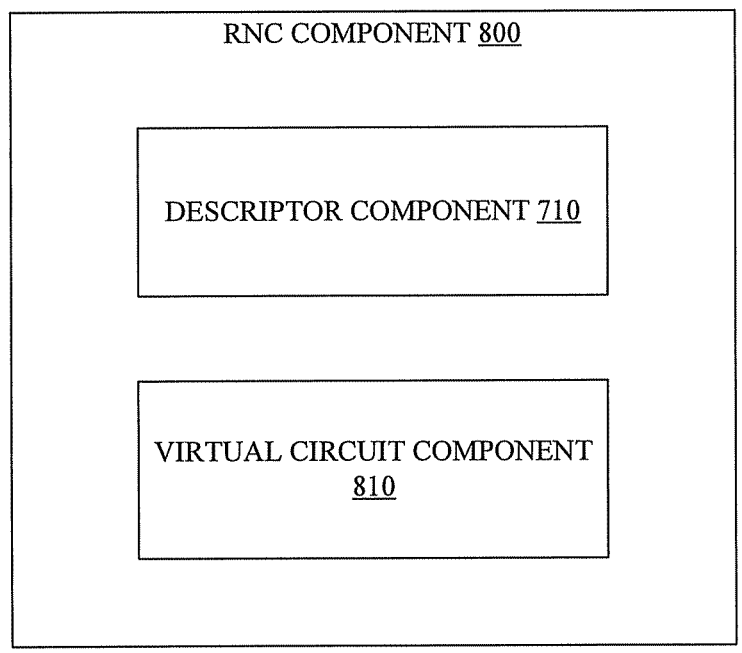
FIG. 8 illustrates another RNC component, in accordance with an embodiment.
Figure 9:
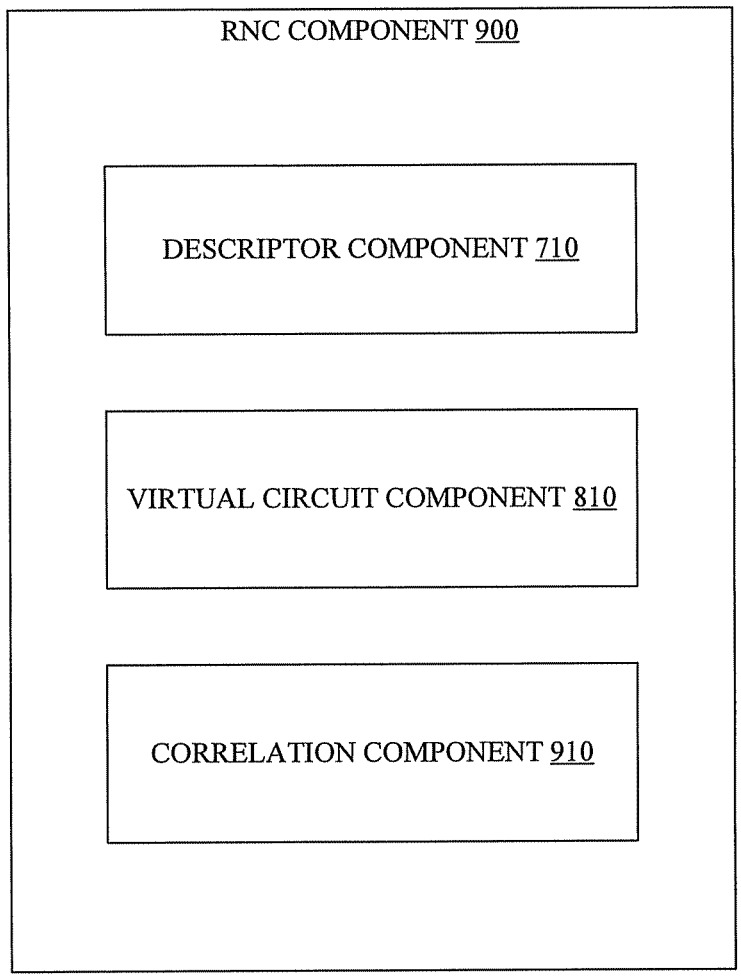
FIG. 9 illustrates an RNC component that includes a correlation component, in accordance with an embodiment.

FIG. 8 illustrates another RNC component (800), in accordance with an embodiment. RNC component 800 includes a virtual circuit component 810 that can create one or more virtual circuits within the virtual path. As described above, available bandwidth of a virtual path can be partitioned among one or more virtual circuits, e.g., based on a number of T1 cables and/or E1 links connected between endpoints of an associated physical port. The line rate (or data rate) of each T1 cable included in a physical port is approximately 1.544 Mbits/second, while the line rate of an E1 link included in the physical transmission link is approximately 2.048 Mbits/second. To account for additional/unused T1 cables and/or E1 links of the physical port, virtual circuit component 810 can create one or more virtual circuits within an ATM packet switching protocol. As described above, descriptor component 710 can build a virtual path descriptor to account for virtual circuits created by virtual circuit component 810. In addition, in an embodiment illustrated by FIG. 9, an RNC component 900 includes a correlation component 910 that can associate one or more virtual circuits with a traffic descriptor created by descriptor component 710.

Figure 10:
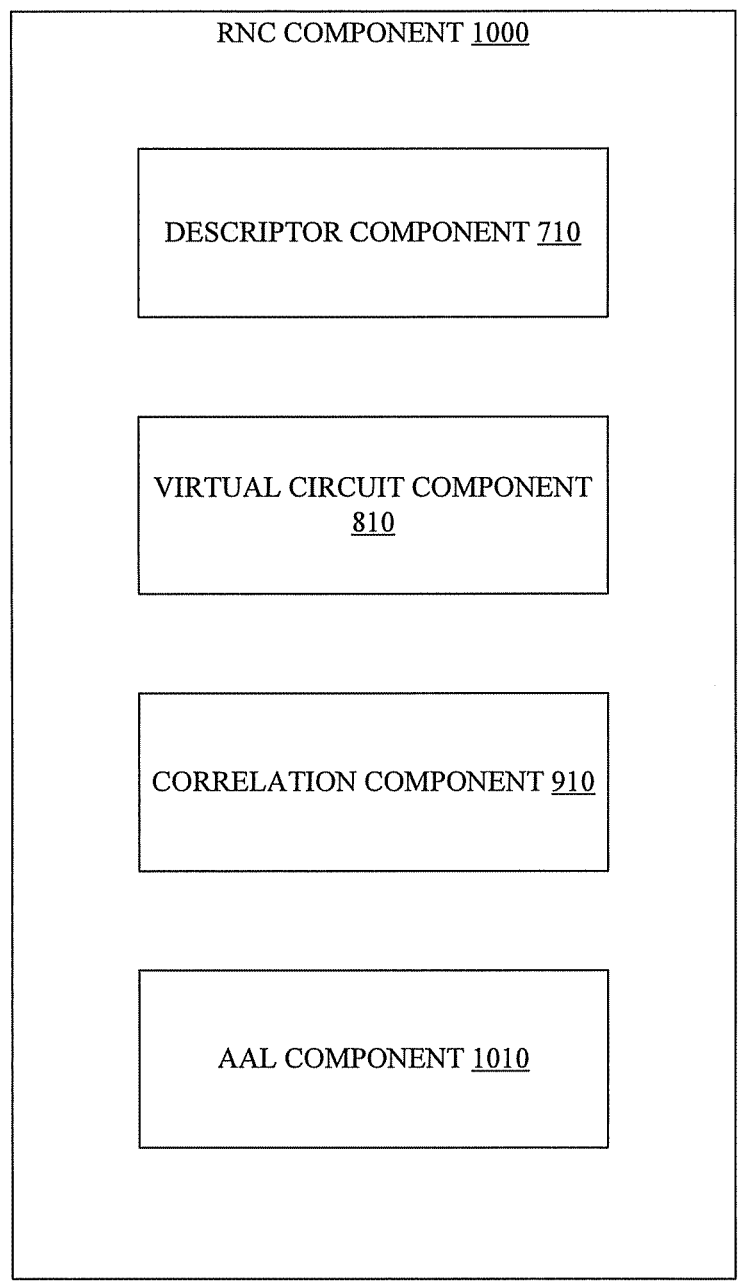
FIG. 10 illustrates an RNC component that includes an asynchronous transfer mode adaptation layer component, in accordance with an embodiment.

Now referring to FIG. 10, yet another RNC component (1000) is illustrated, in accordance with an embodiment. RNC component 1000 includes an asynchronous transfer mode adaptation layer (AAL) component 1010 that can create one or more AAL paths for the created one or more virtual circuits. ATM supports different types of services, e.g., voice, video, data, via ATM adaptation layers, e.g., AAL2 can be used for variable bit rate (VBR) services (e.g., voice traffic); AAL5 can be used for data transfer. An AAL can be negotiated or configured at endpoints on a per-virtual-connection basis via an RNC, e.g., RNC 130. To this end, in one embodiment, AAL component 1010 can create one or more AAL2 paths for virtual circuits created by virtual circuit component 810. For example, AAL component 1010 can include AAL2 paths in an AAL2 distribution unit to enable use of additional capacity associated with the created AAL2 paths.

Figure 11:
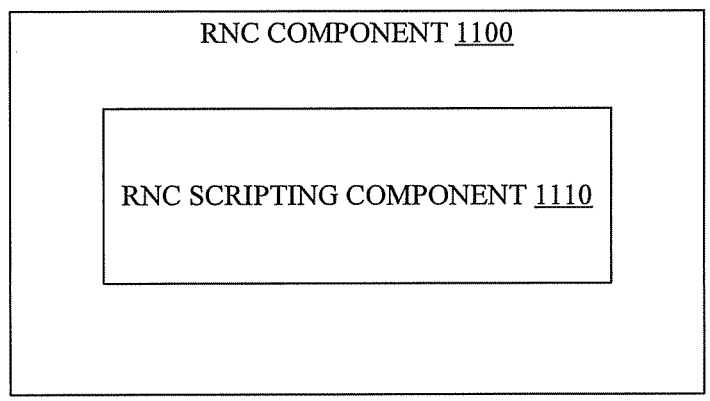
FIG. 11 illustrates an RNC component that includes an RNC scripting component 1010, in accordance with an embodiment.

FIG. 11 illustrates an RNC component 1100 that includes an RNC scripting component 110, in accordance with an embodiment. RNC scripting component 1110 can create one or more scripts that, when executed, can determine capacity of a physical port coupled between a radio network controller and base station. Further, RNC scripting component 1110 can create one or more scripts that, when executed, can configure the radio network controller to utilize additional and/or unused capacity of the physical port based on the determined capacity. RNC scripting component 1110 can create the one or more scripts based on received data, e.g., data associated with one or more base stations of a UTRAN, e.g., UTRAN 220. Each script comprises a programming language that can control one or more software applications. Such applications can be used to control various devices located within the UTRAN, e.g., in order to affect ATM packet switching functions.

For example, RNC scripting component 1110 can receive information associated with at least one base station of the UTRAN. Moreover, RNC scripting component 1010 can use this information to create the one or more scripts that, when executed, can determine capacity of a physical port coupled to the at least one base station; and can configure an associated radio network controller to utilize additional capacity provided by, e.g., new or unused T1 lines or E1 links. It should be appreciated that other RNC components described herein, e.g., 320, 700, 800, 900, 1000, can include components similar to RNC scripting component 1110 that can create one or more scripts that, when executed, automate associated functions of the other RNC components.

Figure 12:
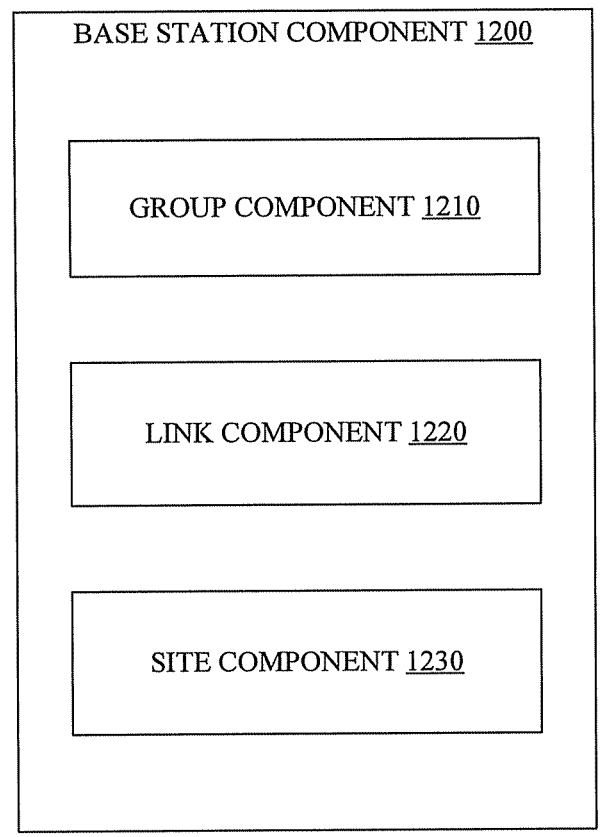
FIG. 12 illustrates a base station component, in accordance with an embodiment.

FIG. 12 illustrates a base station component 1200, in accordance with an embodiment. Base station component 1200 includes a group component 1210, a link component 1220, and a site component 1230. Group component 1210 can build one or more physical ports based on an unused capacity of an interface, e.g., an Iub interface, between a base station and an RNC, e.g., the unused capacity determined by RNC component 320. Further, group component 1210 can add the one or more physical ports to an inverse multiplexing for asynchronous transfer mode (IMA) group. Inverse Multiplexing for ATM (IMA) can be used to increase available bandwidth of a virtual path by grouping or bundling bandwidth associated with physical paths, e.g., T1 or E1 cables, together to form an IMA Group. Link component 1220 can set a number of IMA links as a function of the built one or more physical ports.

Site component 1230 can build one or more traffic descriptors that can be used to define traffic characteristics of a virtual path associated with the increase in available bandwidth of the virtual path—the one or more traffic descriptors can describe service(s) or traffic characteristic(s) of the virtual path. The virtual path can include one or more virtual circuits according to ATM packet switching protocol. Available bandwidth of the virtual path can be partitioned among the one or more virtual circuits based on, e.g., a number of T1 cable and/or E1 links connected between endpoints of the physical port. Site component 1230 can create one or more virtual circuits associated with the virtual path, and relate the one or more virtual circuits with the one or more traffic descriptors.

In addition, site component 1230 can create asynchronous transfer mode adaptation layer (AAL) paths for the created one or more virtual circuits. ATM supports different types of services, e.g., voice, video, data, via ATM adaptation layers, e.g., AAL2 can be used for variable bit rate (VBR) services (e.g., voice traffic); AAL5 can be used for data transfer. An AAL path can be negotiated or configured at endpoints on a per-virtual-connection basis via an RNC, e.g., RNC 130. Moreover, site component 1230 can build one or more class of service descriptors associated with the virtual path—the one or more class of service descriptors can describe QoS parameters of data flow between endpoints (or nodes) of the virtual path.

Figure 13:
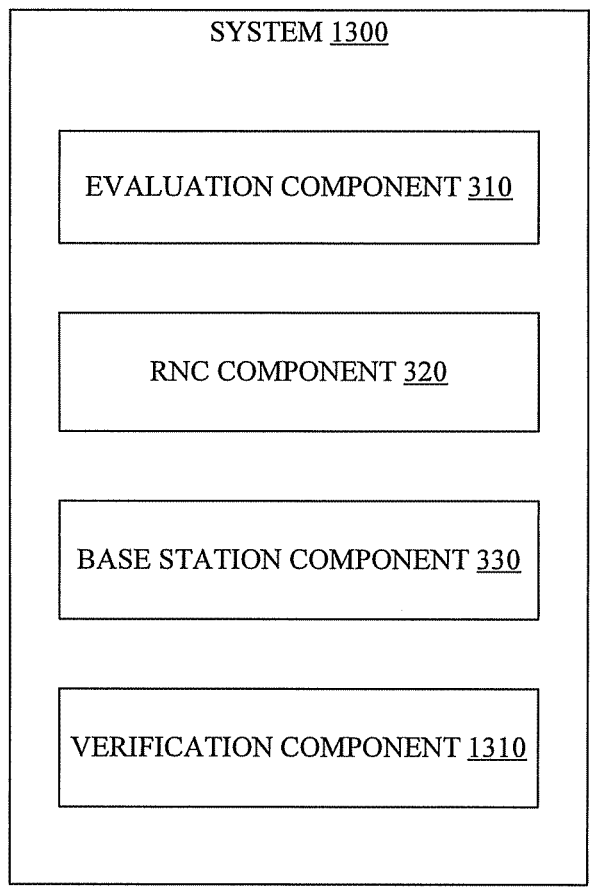
FIG. 13 illustrates another demonstrative system 1200 for effectively managing capacity of a wireless-based communication infrastructure, in accordance with an embodiment.

Now referring to FIG. 13, another demonstrative system 1300 for effectively managing capacity of a wireless-based communication infrastructure is illustrated, in accordance with an embodiment. System 1300 includes a verification component 1310 that can record, e.g., in a data store, generated configuration data, e.g., configuration data generated by evaluation component 310, before an associated base station is configured to utilize unused capacity. Moreover, verification component 1310 can emphasize differences between the generated, pre-configuration data and configuration data used to configure the base station to utilize the unused capacity. In this way, verification component can be used to troubleshoot issues affecting management of the wireless-based communication infrastructure.

FIGS. 14-23 illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 14:
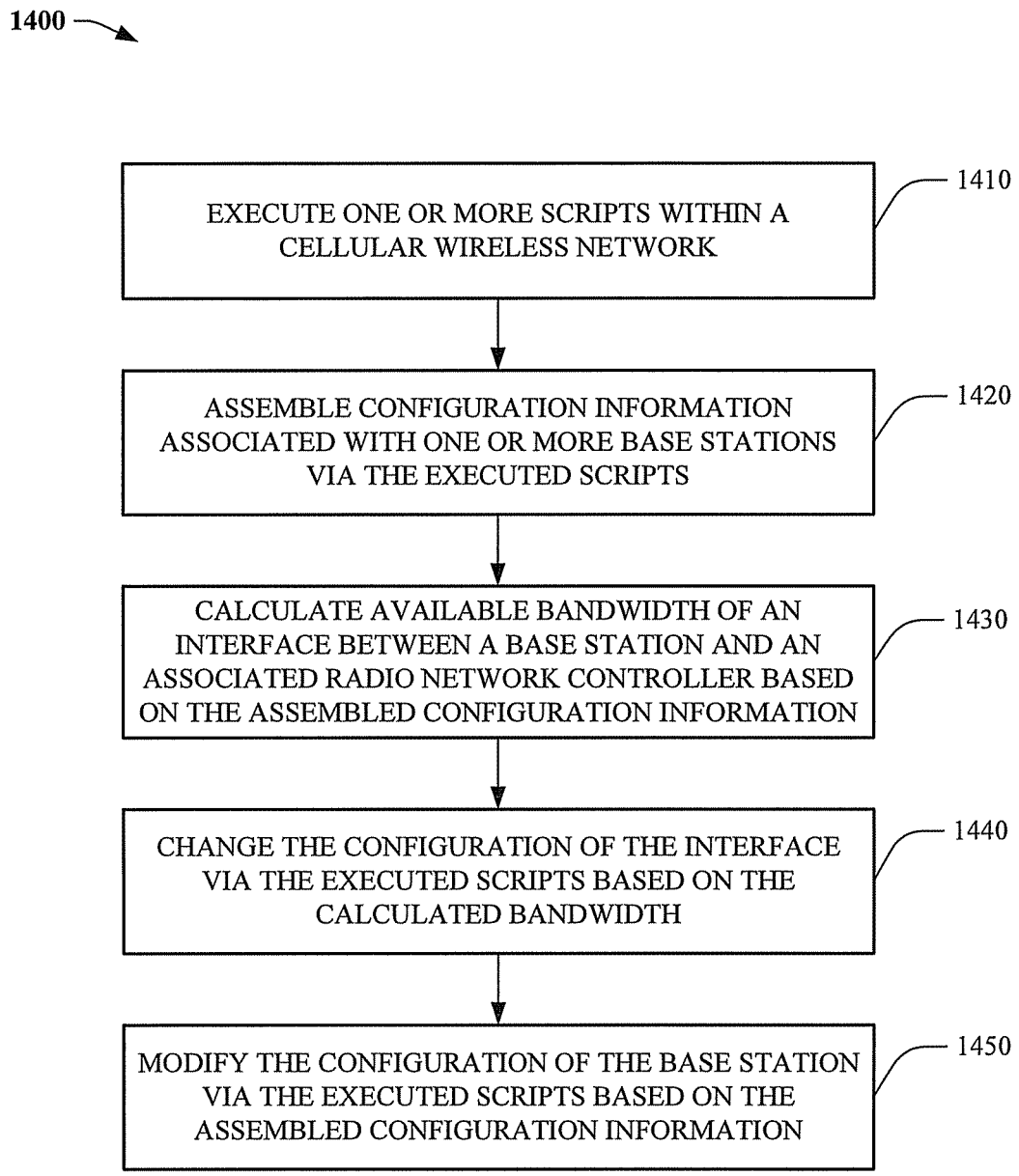
FIG. 14 illustrates a process for effectively managing capacity of a wireless-based communication infrastructure, in accordance with an embodiment.

Referring now to FIG. 14, a process 1400 for effectively managing capacity of a wireless-based communication infrastructure, in accordance with an embodiment. At 1410, one or more scripts can be executed within a cellular wireless network, e.g., a 3GPP UMTS. It should be appreciated that the one or more scripts comprise a programming language that can control one or more software and/or hardware applications. Such applications can be used to obtain information about various components of, for example, a 3GPP UMTS, and/or control various devices located within the 3GPP UMTS, e.g., to affect ATM packet switching functions.

At 1420, configuration information associated with one or more base stations of the cellular wireless network can be assembled (or collected) via the scripts executed at 1410. The configuration information can include, e.g., hardware specific information associated with ATM line cards coupled to T1 cable and/or E1 links of a physical transmission link connected to the one or more base stations. At 1430, available bandwidth of an interface, e.g., Iub interface, between at least one base station and an associated radio controller, e.g., RNC 130, can be calculated based on the assembled configuration information.

Configuration of the interface can be modified at 1440 to account for additional physical bandwidth, e.g., available via unused T1 cable, through execution of one or more scripts at 1410. At 1450, the configuration of the base station associated with the interface can be modified via scripts executed at 1410, based on configuration information assembled at 1420. In one embodiment of process 1400 (not shown), the configuration information assembled at 1420 can be stored in a data store, e.g., any removable/non-removable storage medium, via the scripts executed at 1410. Accordingly, configuration of the interface can be modified to account for additional physical bandwidth based on the stored configuration information.

Figure 15:
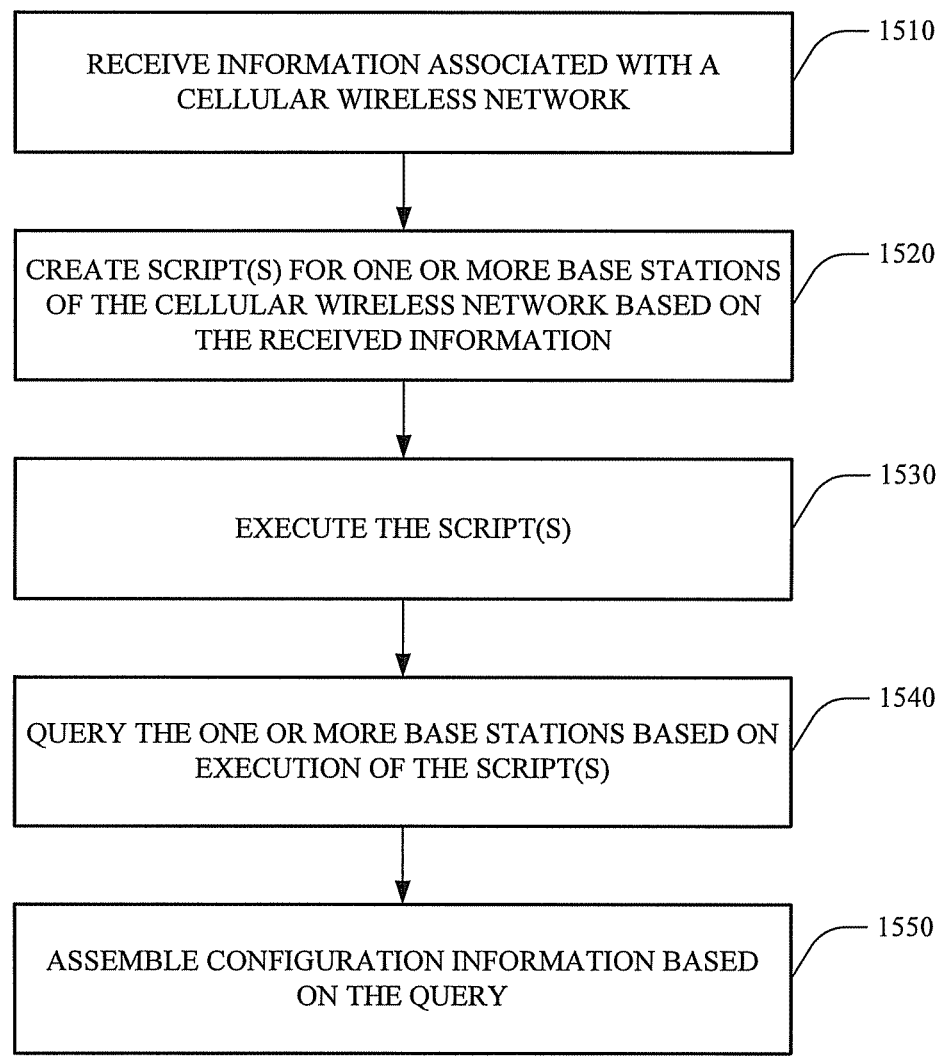
FIG. 15 illustrates a process for assembling configuration information associated with one or more base stations of a cellular wireless network, in accordance with an embodiment.

FIG. 15 illustrates a process 1500 for assembling configuration information associated with one or more base stations of a cellular wireless network, in accordance with an embodiment. At 1510, information associated with a cellular wireless network can be received. Script(s) for one or more base stations of the cellular wireless network can be created at 1520 based on the information received at 1510. At 1530, the script(s) can be executed (e.g., via computing device(s) located at the one or more base stations, via computing device(s) located within the cellular wireless network, via computing devices(s) remote from the cellular wireless network). The one or more base stations can be queried at 1540 via execution of the script(s) at 1530. At 1550, the configuration information can be assembled based on the query of the one or more base stations.

Figure 16:
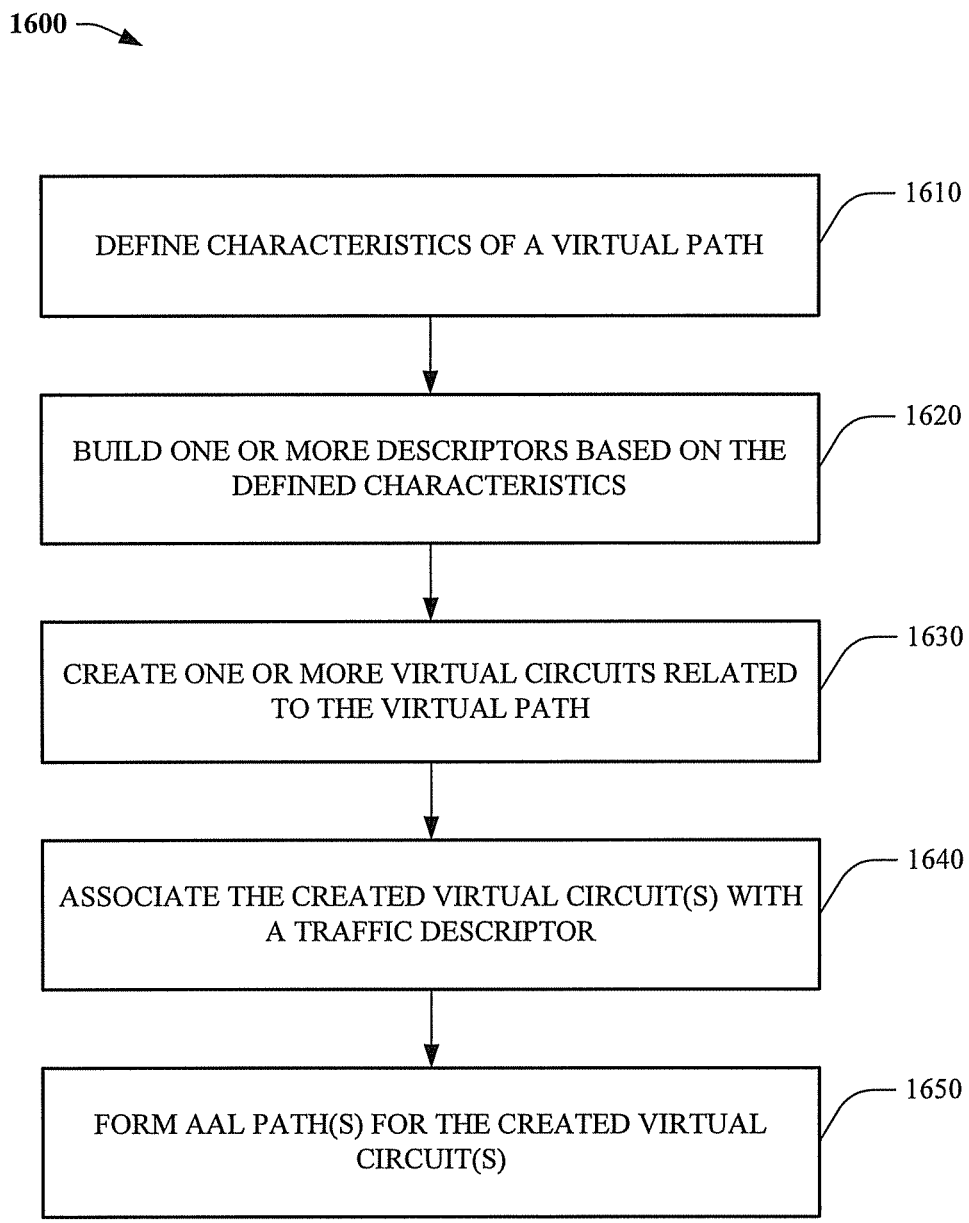
FIG. 16 illustrates a process for configuring a radio network controller, in accordance with an embodiment.

FIG. 16 illustrates another process (1600) for effectively managing capacity of a wireless-based communication infrastructure, in accordance with an embodiment. At 1610, characteristics of a virtual path, e.g., associated with an Iub interface between a base station and a radio network controller, can be characterized (e.g., to determine available bandwidth, to determine current configuration information) based on execution of one or more scripts, e.g., created by process 1600. One or more descriptors can be created at 1620, based on execution of the one or more scripts and characteristics of the virtual path defined at 1610.

In an aspect (not shown), process 1600 can build at least one of a traffic descriptor, a class of service descriptor, or a virtual path descriptor, based on execution of the script(s). As described above, a traffic descriptor can be used to describe service(s) or traffic characteristic(s) of a virtual circuit established between associated endpoints. A class of service descriptor can be used to describe QoS parameters of data flow between endpoints, e.g., associated with an Iub interface. A virtual path descriptor can be used to describe characteristics of a virtual path, e.g., size (or bandwidth) of the virtual path. Accordingly, in another aspect (not shown), process 1600 can build a virtual path descriptor to account for an increase in capacity of virtual circuits associated with the virtual path via execution of the one or more scripts.

As described above, a virtual path can include one or more virtual circuits according to the ATM packet switching protocol. Available bandwidth of the virtual path can be partitioned among the one or more virtual circuits based on a number of physical links, e.g., T1 cable and/or E1 links, connected between endpoints of the physical port. To this end, one or more virtual circuits related to the virtual path can be created, via execution of the one or more scripts, at 1630. At 1640, the created one or more virtual circuits can be associated (or linked) to a traffic descriptor via execution of the script(s). An asynchronous transfer mode adaptation layer (AAL) path for at least one of the created one or more virtual circuits can be formed via execution of the one or more scripts at 1650.

Figure 17:
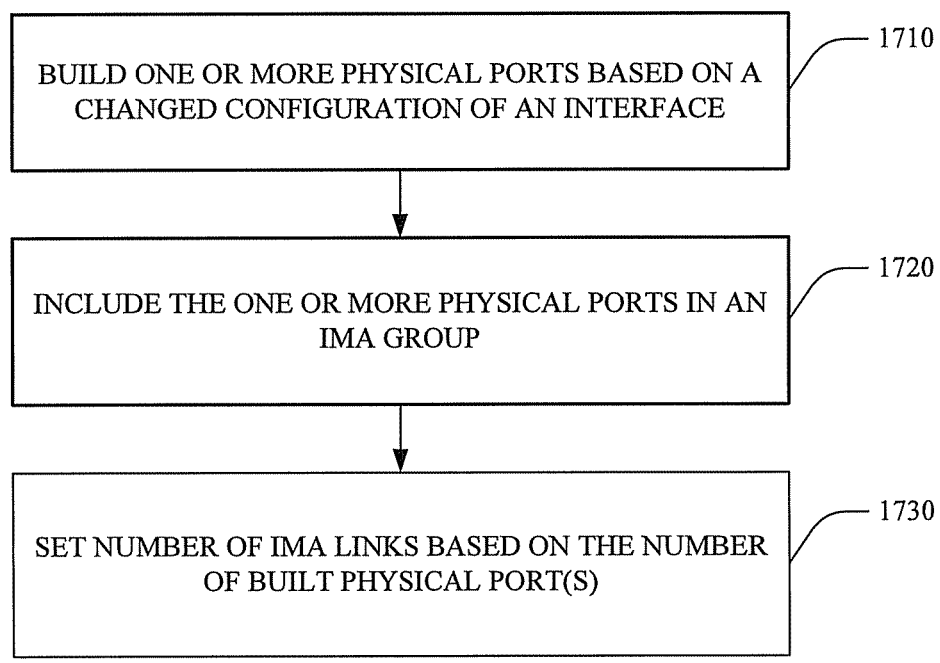
FIG. 17 illustrates a process for modifying an inverse multiplexing for asynchronous transfer mode group, in accordance with an embodiment.

Now referring to FIG. 17, a process 1700 for modifying an inverse multiplexing for asynchronous transfer mode (IMA) group is illustrated, in accordance with an embodiment. At 1710, one or more physical ports can be built, via execution of at least one script, based on an unused capacity of an interface, e.g., Iub interface, between a base station and an RNC, e.g., an unused capacity that can be determined by RNC component 320. The one or more physical ports can be included in an IMA group at 1720 via execution of the script(s). As described above, IMA can be used to increase available bandwidth of a virtual path by grouping or bundling physical links, e.g., T1 or E1 cables, together to form an IMA Group. Accordingly, a number of IMA links can be set as a function of the number of built one or more physical ports via execution of the script(s).

Figure 18:
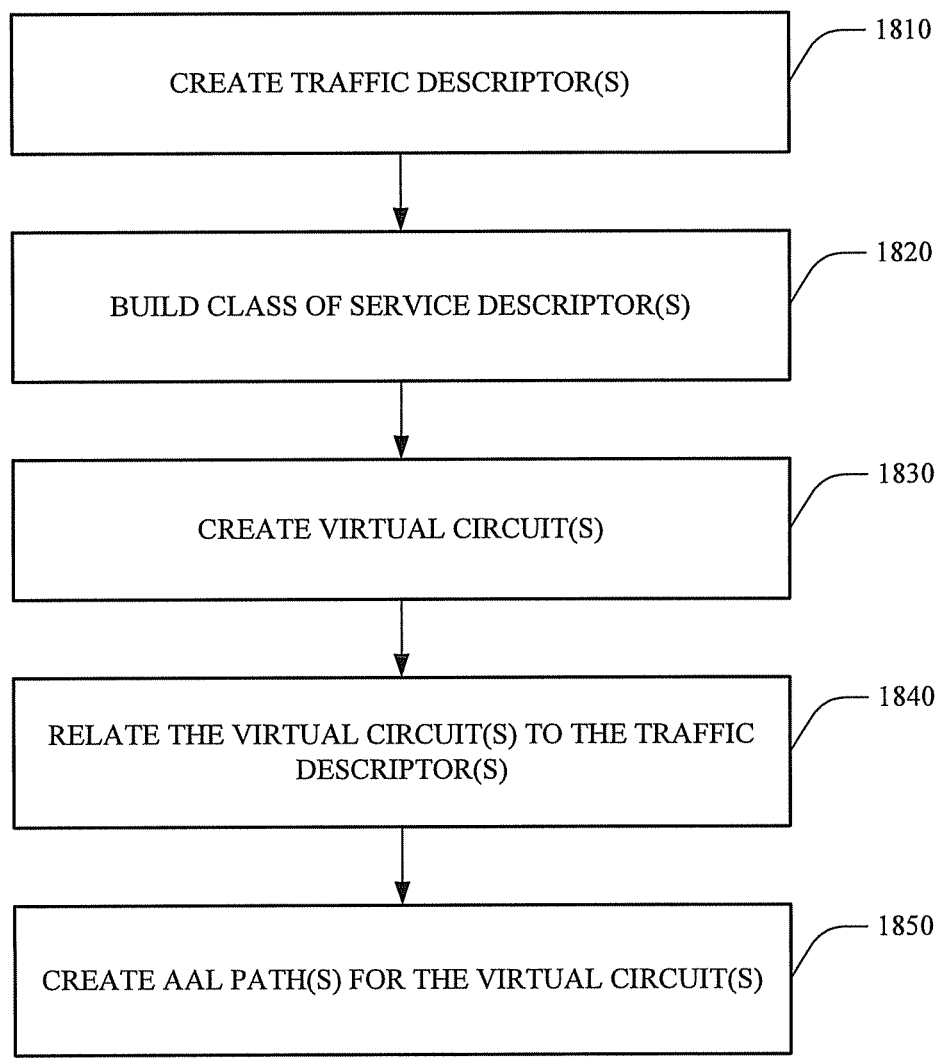
FIG. 18 illustrates a process for configuring a base station, in accordance with an embodiment.

FIG. 18 illustrates a process 1800 for configuring a base station, in accordance with an embodiment. At 1810, traffic descriptor(s) can be created by executing at least one script. The created traffic descriptor(s) can define traffic characteristics of a virtual path associated with the base station—the virtual path can be created, for example, by process 1600 described above. Class of service descriptor(s) associated with the virtual path can be built by executing at least one script at 1820. At 1830, virtual circuit(s) associated with the virtual path can be created by executing script(s). The virtual circuit(s) can be related (or linked) with the traffic descriptor(s) by executing at least one script at 1840. At 1850, AAL path(s) can be created for the virtual circuit(s) by executing script(s).

Figure 19:
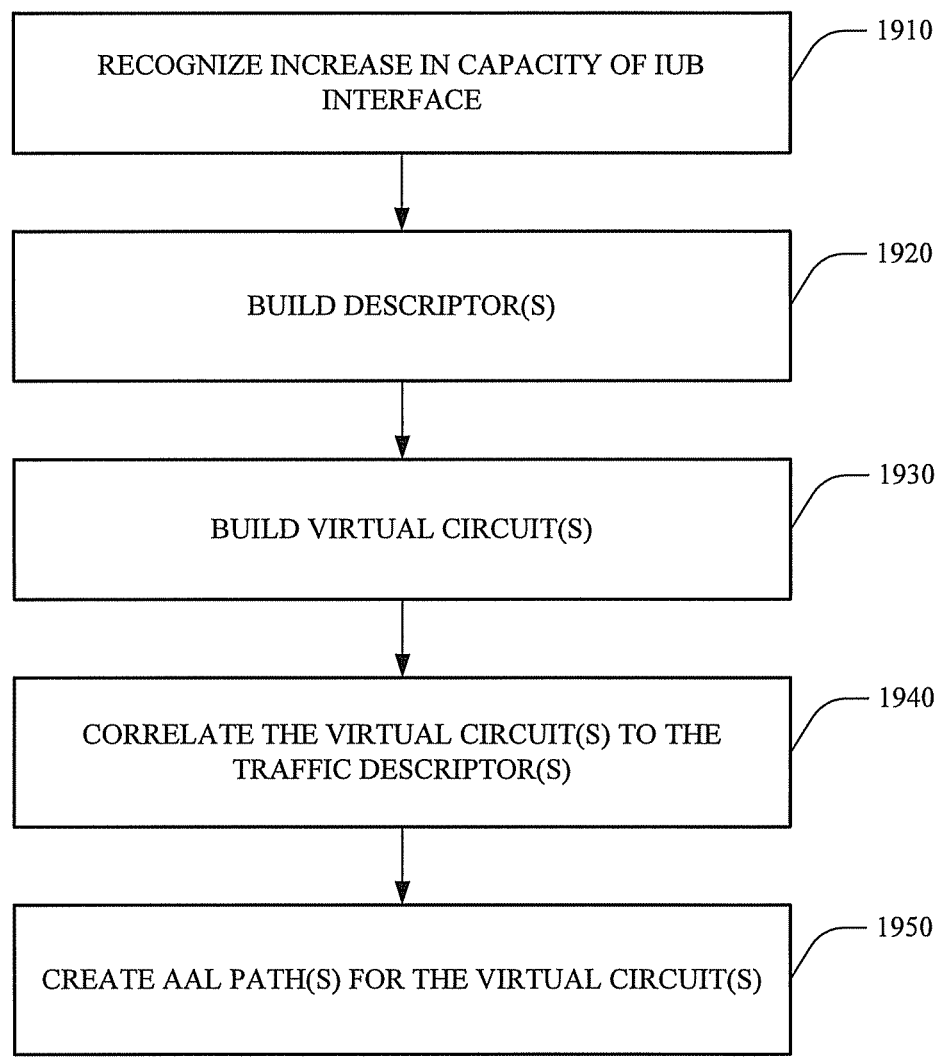
FIG. 19 illustrates yet another process for effectively managing capacity of a wireless-based communication infrastructure, in accordance with an embodiment.

FIG. 19 illustrates yet another process (1900) for effectively managing capacity of a wireless-based communication infrastructure, in accordance with an embodiment. At 1910, an increase in capacity of an interface, e.g., Iub interface, between a radio network controller and a base station within a Universal Mobile Telecommunication System can be recognized. Descriptor(s) that define characteristics of a virtual path associated with the recognized increase in capacity can be built at 1920. At 1930, at least one virtual circuit associated with the virtual path can be built. The virtual circuit(s) can be correlated with the descriptor(s) at 1940. At 1950, AAL paths can be created for the at least one virtual circuit.

Figure 20:
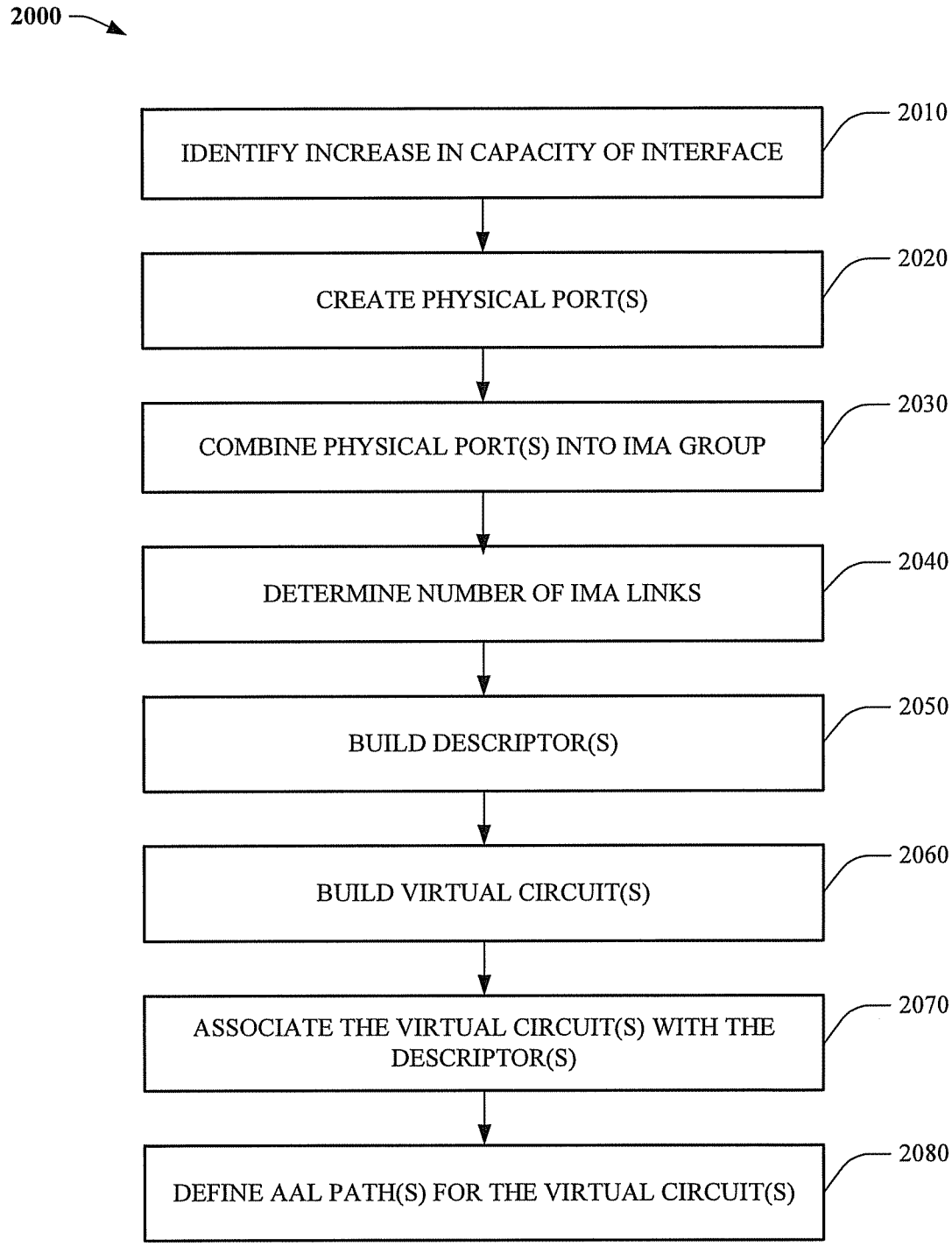
FIG. 20 illustrates a process for configuring at least one base station and a radio network controller in a Universal Mobile Telecommunication System, in accordance with an embodiment.

Now referring to FIG. 20, a process 2000 for configuring at least one base station and a radio network controller in a Universal Mobile Telecommunication System is illustrated, in accordance with an embodiment. At 2010, an increase in capacity (or available bandwidth) of an interface, e.g., Iub interface, between the at least one base station and the radio network controller can be identified. One or more physical ports associated with the interface can be created at 2020 based on the identified increase in capacity of the interface. At 2030, one or more of the created physical ports can be assigned to an inverse multiplexing for asynchronous transfer mode (IMA) group. The number of IMA links can be determined at 2040 based on the created port(s). At 2050, at least one descriptor associated with a virtual path can be built based on the identified increase in capacity. At least one virtual circuit associated with the virtual path can be built at 2060 based on the identified increase in capacity. At 2070, virtual circuit(s) can be associated with the at least one descriptor. One or more asynchronous transfer mode adaptation layer paths can be defined for the at least one virtual circuit at 2080.

Figure 21:
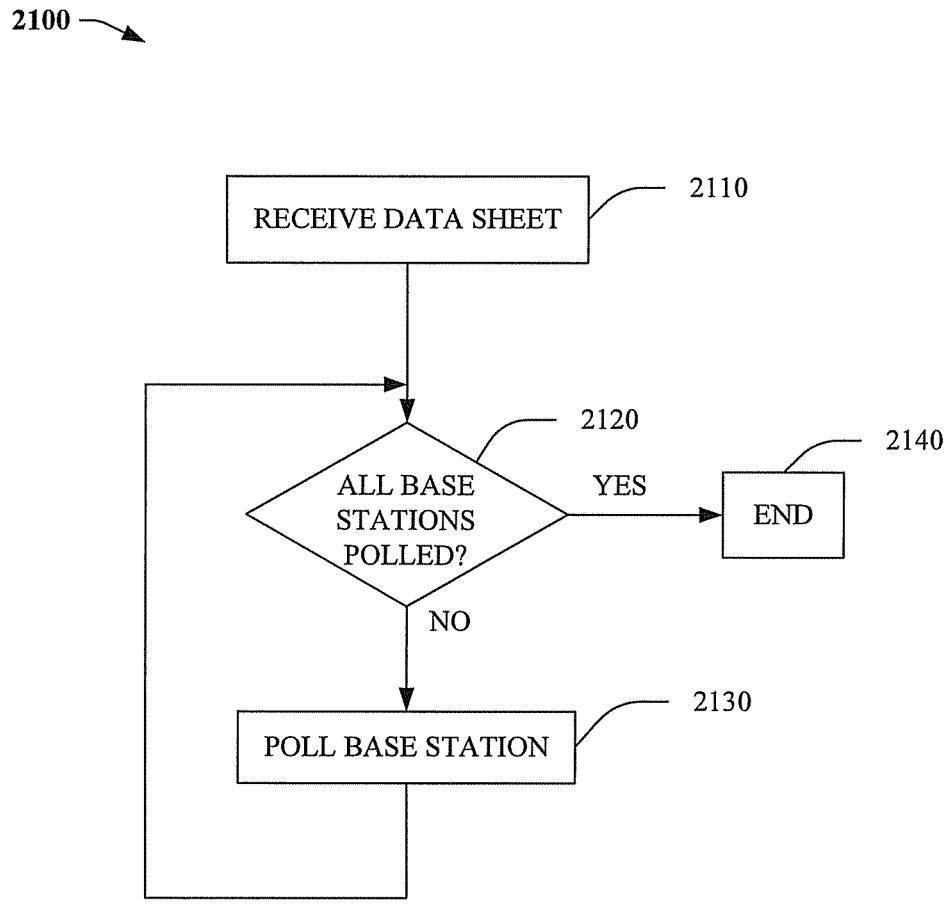
FIG. 21 illustrates a process for automatically creating configuration information, in accordance with an embodiment.

FIG. 21 illustrates a process 2100 for automatically creating configuration information, in accordance with an embodiment. At 2110, a data sheet, e.g., a table, which matches one or more radio network controllers to one or more base stations of a UTRAN can be received. It can be determined at 2120 whether the one or more base stations have been polled for configuration information. If it was determined that a base station has not been polled, the base station can be polled at 2130; else flow can continue to 2140. In one aspect, the base station can be polled by recording and/or gathering data associated with the configuration of the base station. Such data can include, for example, a number of T1 and/or E1 connections established at an Iub interface associated with the base station. Flow can continue to 2120 after the base station was polled at 2130.

Figure 22:
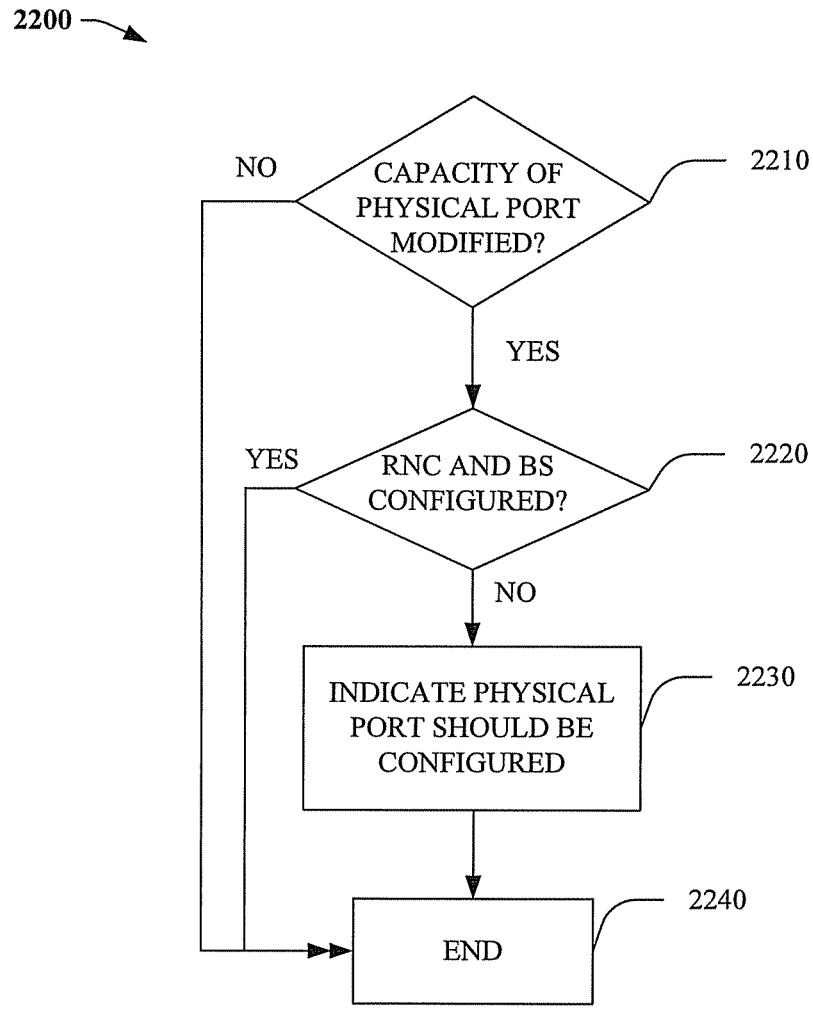
FIG. 22 illustrates a process for automatically determining whether a physical interface includes unused bandwidth, in accordance with an embodiment.

FIG. 22 illustrates a process for automatically determining whether a physical interface includes unused bandwidth, in accordance with an embodiment. At 2210, it can be determined whether capacity of a physical port associated with the physical interface was modified within a predetermined period of time. The predetermined period of time can be, for example, a calendar date, or a period between two days. If it was determined that capacity of the physical port was modified within the predetermined period of time, than flow can continue to 2220, at which it can be an identified whether a radio network controller and/or base station associated with the physical interface were configured within the predetermined period of time; else flow can proceed to 2240.

If it was determined that the radio network controller and/or base station were not configured, then flow can continue to 2230, at which the configuration data can be marked and/or highlighted to indicate that hardware and/or software associated with the physical port should be configured to account for modified capacity of the physical port, e.g., capacity associated with unused bandwidth; else flow can proceed to 2240. Flow can continue from 2230 to 2240 after configuration data is marked and/or highlighted.

Figure 23:
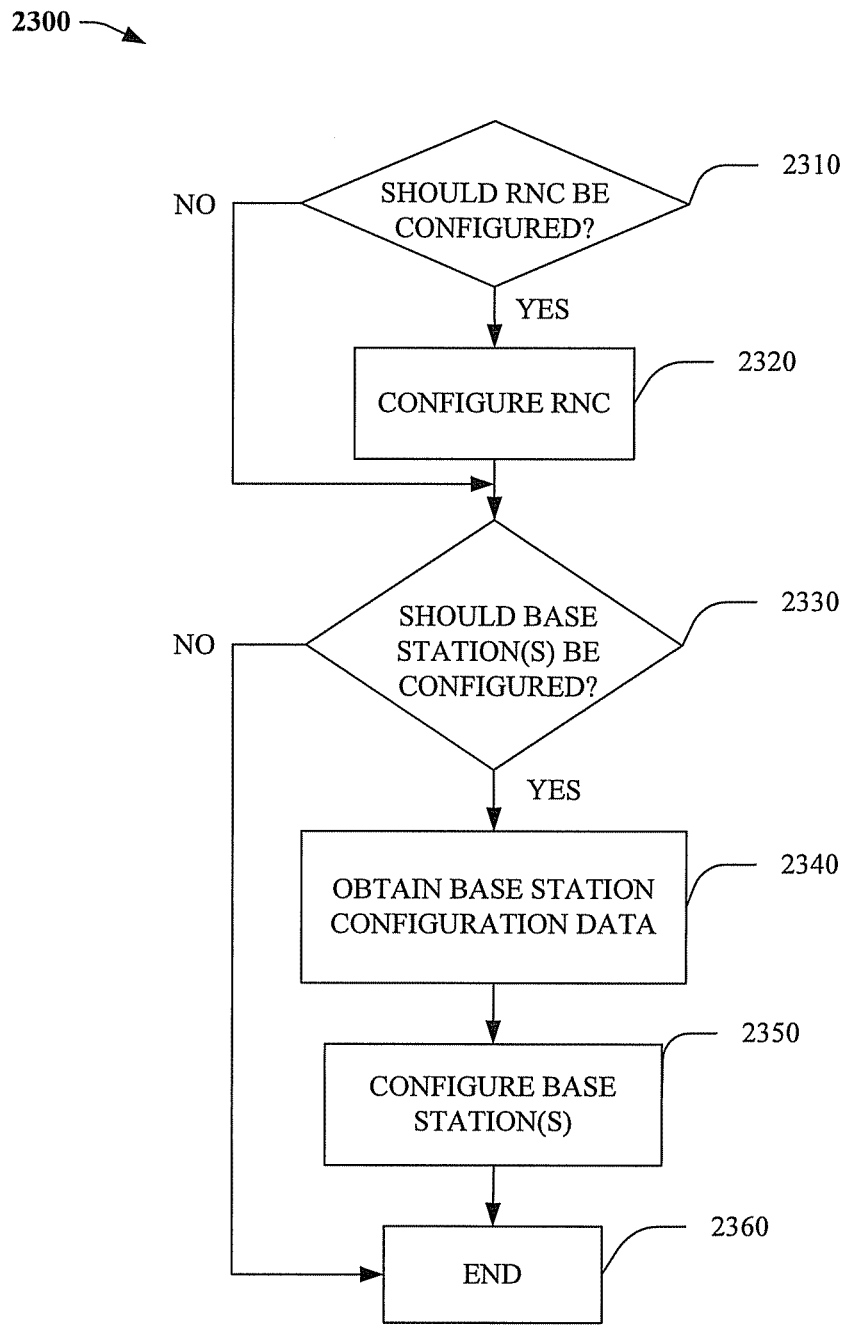
FIG. 23 illustrates a process for automatically configuring a cellular wireless network to utilize unused bandwidth, in accordance with an embodiment.

FIG. 23 illustrates a process for automatically configuring a cellular wireless network to utilize unused bandwidth, in accordance with an embodiment. At 2310, it can be determined whether a radio network controller should be configured based on configuration information, e.g., information obtained by process 2100 (see above). If it was determined that that the radio network controller should be configured, then flow can continue to 2320, at which the radio network controller can be configured; else flow can proceed to 2330. Flow can continue from 2320 to 2330 after the radio network controller was configured at 2320.

At 2330, it can be determined whether one or more base stations coupled to the radio network controller should be configured. If it was determined that the base station(s) should not be configured, then flow can proceed to 2360; else flow can continue to 2340, at which base station configuration data can be obtained, e.g., by process 2100 (see above). Flow can continue from 2340 to 2350, at which the base station(s) can be configured based on configuration information, e.g., information obtained by process 2100 (see above). Flow can continue from 2350 to 2360 after the base station(s) are configured.

Figure 24:
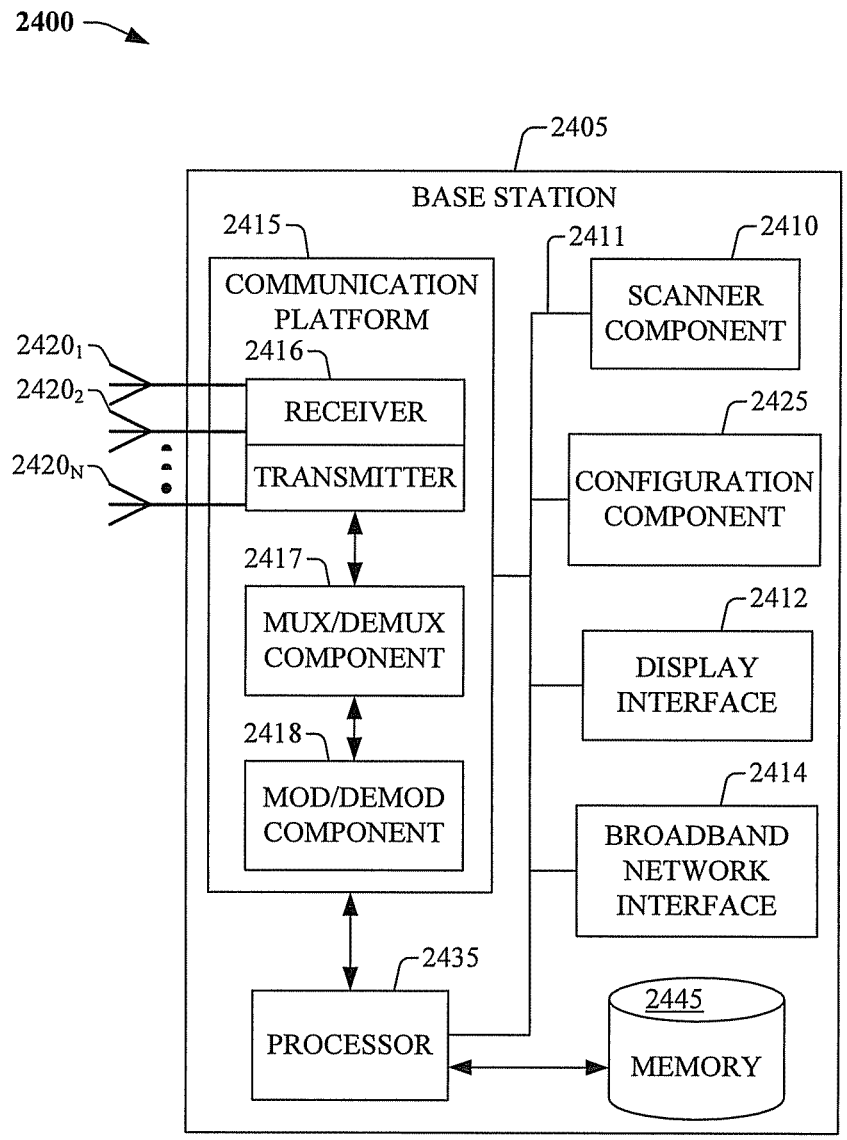
FIG. 24 illustrates a block diagram of a base station, in accordance with an embodiment.
Figure 25:
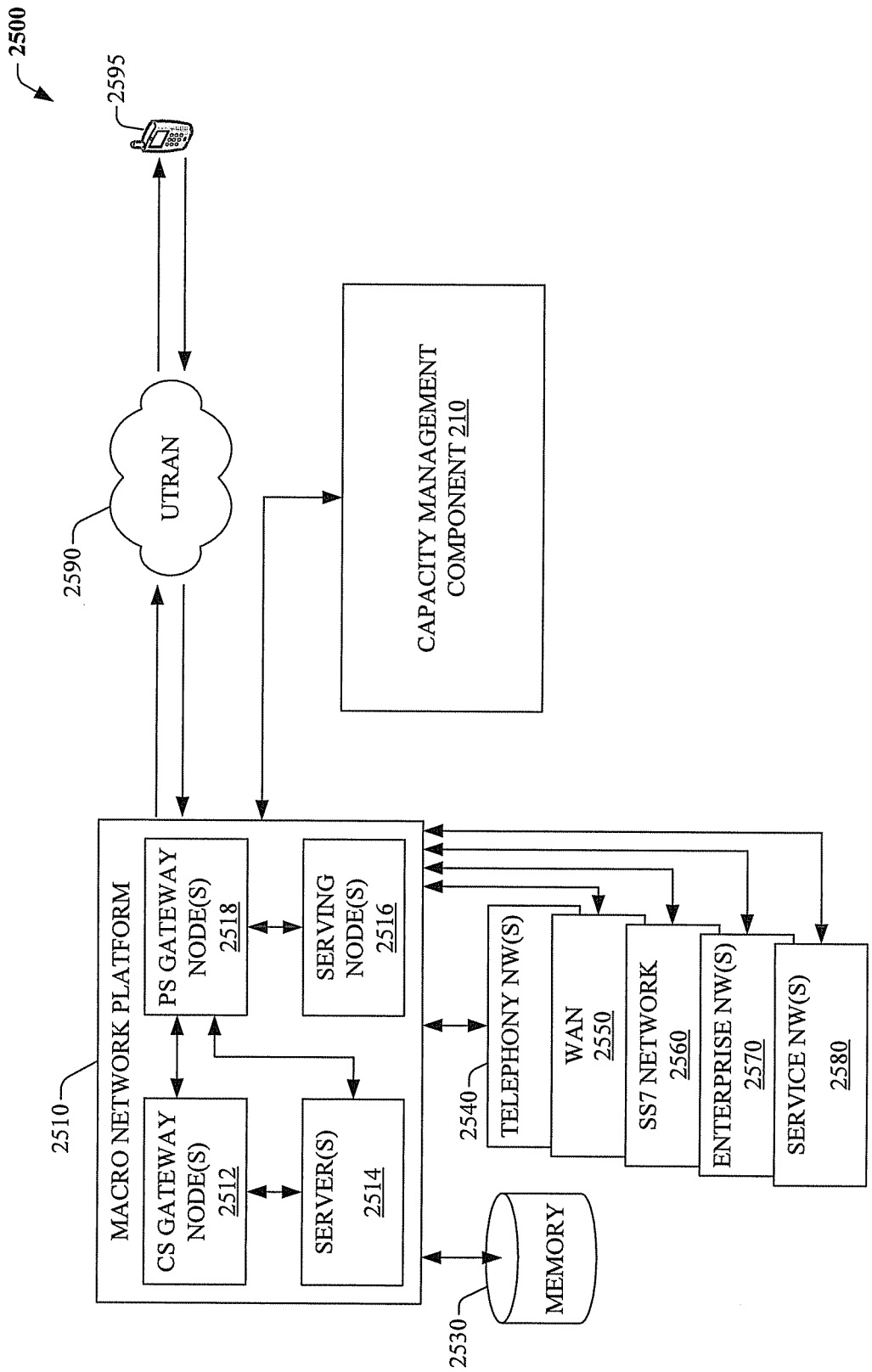
FIG. 25 illustrates a block diagram of a wireless network environment, in accordance with an embodiment.

To provide further context for various aspects of the disclosed subject matter, FIGS. 24 and 25 illustrate, respectively, a block diagram of an embodiment 2400 of a base station 2405 that can enable or exploit features or aspects of the disclosed subject matter; and a wireless network environment 2500 that includes a macro network platform 2510, UTRAN 2590, and capacity management component 210 that exploit aspects of the subject innovation in accordance with various aspects of the subject specification. In embodiment 2400, base station 2405 can receive and transmit signal(s) from and to wireless devices, e.g., wireless ports and routers, or the like, through a set of antennas $2420_1$-$2420_N$ (N is a positive integer). Antennas $2420_1$-$2420_N$ are a part of communication platform 2415, which comprises electronic components and associated circuitry that provides for processing and manipulation of received signal(s) and signal(s) to be transmitted.

In an aspect, communication platform 2415 includes a receiver/transmitter 2416 that can convert analog signals to digital signals upon reception of the analog signals, and convert digital signals to analog signals upon transmission. In addition, receiver/transmitter 2416 can divide a single data stream into multiple, parallel data streams, or perform the reciprocal operation. Coupled to receiver/transmitter 2416 is a multiplexer/demultiplexer 2417 that facilitates manipulation of signal in time and frequency space. Electronic component 2417 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 2417 can scramble and spread information (e.g., codes) according to substantially any code known in the art, e.g., Hadamard-Walsh codes, Baker codes, Kasami codes, polyphase codes, etc. A modulator/demodulator 2418 is also a part of communication platform 2415, and can modulate information according to multiple modulation techniques, such as frequency modulation, amplitude modulation, e.g., M-ary quadrature amplitude modulation (QAM), with M a positive integer), phase-shift keying (PSK), etc.

Base station 2405 also includes a processor 2435 configured to confer, at least in part, functionality to substantially any electronic component in base station 2405. In particular, processor 2435 can facilitate configuration of base station 2405 via capacity management component 210, and one or more component therein. Additionally, base station 2405 includes display interface 2412, which can display functions that control functionality of base station 2405, or reveal operation conditions thereof. In addition, display interface 2412 can include a screen to convey information to an end user. In an aspect, display interface 2412 can be a liquid crystal display (LCD), a plasma panel, a monolithic thin-film based electrochromic display, and so on. Moreover, display interface can also include a component (e.g., speaker) that facilitates communication of aural indicia, which can also be employed in connection with messages that convey operational instructions to an end user. Display interface 2412 also facilitates data entry e.g., through a linked keypad or via touch gestures, which can cause base station 2405 to receive external commands, e.g., restart operation.

Broadband network interface 2414 facilitates connection of base station 2405 to service provider network 155 via backhaul link(s) 151 (not shown in FIG. 24), which enables incoming and outgoing data flow. Broadband network interface 2414 can be internal or external to base station 2405, and it can utilize display interface 2412 for end-user interaction and status information delivery.

Processor 2435 also is functionally connected to communication platform 2415 and can facilitate operations on data, e.g., symbols, bits, or chips, for multiplexing/demultiplexing, such as effecting direct and inverse fast Fourier transforms, selection of modulation rates, selection of data packet formats, inter-packet times, etc. Moreover, processor 2435 is functionally connected, via data, system, or address bus 2411, to display interface 2412 and broadband network interface 2414 to confer, at least in part, functionality to each of such components.

In base station 2405, memory 2445 can retain location and/or macro sector identifier(s); access list(s) that authorize access to wireless coverage through base station 2405; sector intelligence that includes ranking of macro sectors in the macro wireless environment of base station 2405, radio link quality and strength associated therewith, or the like. Memory 2445 also can store data structures, code instructions and program modules, system or device information, code sequences for scrambling, spreading and pilot transmission, base station configuration, and so on. Processor 2435 is coupled, e.g., via a memory bus, to memory 2445 in order to store and retrieve information used to operate and/or confer functionality to the components, platform, and interface that reside within base station 2405.

With respect to FIG. 25, wireless communication environment 2500 includes capacity management component 210 and macro network platform 2510, which serves or facilitates communication with user equipment 2595 via UTRAN 2590. It should be appreciated that in cellular wireless technologies (e.g., 3GPP UMTS, HSPA, 3GPP LTE, 3GPP2 UMB), macro network platform 2510 is embodied in a core network. It is noted that UTRAN 2590 can include base station(s), or access point(s), and associated electronic circuitry and deployment site(s), in addition to a wireless radio link operated in accordance with the base station(s). Accordingly, UTRAN 2590 can comprise various coverage cells like cell 105. In addition, it should be appreciated that capacity management component 210 can be included in macro network platform 3110, in UTRAN 2590, or outside of capacity management component 210 and UTRAN 2590.

Generally, macro platform 2510 includes components, e.g., nodes, gateways, interfaces, servers, or platforms that facilitate both packet-switched (PS), e.g., internet protocol (IP), frame relay, asynchronous transfer mode (ATM), and circuit-switched (CS) traffic, e.g., voice and data, and control generation for networked wireless communication. In an aspect of the subject innovation, macro network platform 2510 includes CS gateway node(s) 2512 which can interface CS traffic received from legacy networks like telephony network(s) 2540, e.g., public switched telephone network (PSTN), or public land mobile network (PLMN), or a SS7 network 2560. Circuit switched gateway 2512 can authorize and authenticate traffic, e.g., voice, arising from such networks. Additionally, CS gateway 2512 can access mobility, or roaming, data generated through SS7 network 2560; for instance, mobility data stored in a VLR, which can reside in memory 2530. Moreover, CS gateway node(s) 2512 interfaces CS-based traffic and signaling and gateway node(s) 2518. As an example, in a 3GPP UMTS network, PS gateway node(s) 2518 can be embodied in gateway GPRS support node(s) (GGSN).

In addition to receiving and processing CS-switched traffic and signaling, PS gateway node(s) 2518 can authorize and authenticate PS-based data sessions with served, e.g., through macro RAN, wireless devices. Data sessions can include traffic exchange with networks external to the macro network platform 2510, like wide area network(s) (WANs) 2550; enterprise networks (NWs) 2570, e.g., enhanced 911, or service NW(s) 2580 like IP multimedia subsystem (IMS). It should be appreciated that local area network(s) (LANs), which may be a part of enterprise NW(s), can also be interfaced with macro network platform 2510 through PS gateway node(s) 2518. Packet-switched gateway node(s) 2518 generates packet data contexts when a data session is established. To that end, in an aspect, PS gateway node(s) 2518 can include a tunnel interface, e.g., tunnel termination gateway (TTG) in 3GPP UMTS network(s) (not shown), which can facilitate packetized communication with disparate wireless network(s), such as Wi-Fi networks. It should be further appreciated that the packetized communication can include multiple flows that can be generated through server(s) 2514. It is to be noted that in 3GPP UMTS network(s), PS gateway node(s) 2518 (e.g., GGSN) and tunnel interface (e.g., TTG) comprise a packet data gateway (PDG).

Macro network platform 2510 also includes serving node(s) 2516 that can convey the various packetized flows of information, or data streams, received through PS gateway node(s) 2518. As an example, in a 3GPP UMTS network, serving node(s) can be embodied in serving GPRS support node(s) (SGSN).

As indicated above, server(s) 2514 in macro network platform 2510 can execute numerous applications, e.g., location services, online gaming, wireless banking, wireless device management, etc. that can generate multiple disparate packetized data streams or flows; and can manage such flows, e.g., schedule, queue, format. Such application(s), for example can include add-on features to standard services provided by macro network platform 2510. Data streams can be conveyed to PS gateway node(s) 2518 for authorization/authentication and initiation of a data session, and to serving node(s) 2516 for communication thereafter. Server(s) 2514 can also effect security, e.g., implement one or more firewalls, of macro network platform 2510 to ensure network's operation and data integrity in addition to authorization and authentication procedures that CS gateway node(s) 2512 and PS gateway node(s) 2518 can enact. Moreover, server(s) 2514 can provision services from external network(s), e.g., WAN 2550, or Global Positioning System (GPS) network(s), which can be a part of enterprise NW(s) 2580. It is to be noted that server(s) 2514 can include one or more processors configured to confer at least in part the functionality of macro network platform 2510. To that end, the one or more processors can execute code instructions stored in memory 2530, for example.

In example wireless environment 2500, memory 2530 stores information related to operation of macro network platform 2510. Information can include business data associated with subscribers; market plans and strategies, e.g., promotional campaigns, business partnerships; operational data for mobile devices served through macro network platform; service and privacy policies; end-user service logs for law enforcement; and so forth. Memory 2530 can also store information from at least one of telephony network(s) 2540, WAN 2550, SS7 network 2560, enterprise NW(s) 2570, or service NW(s) 2580.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "data store," "data storage," "database," and substantially any other information storage component relevant to operation and functionality of a component, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 26:
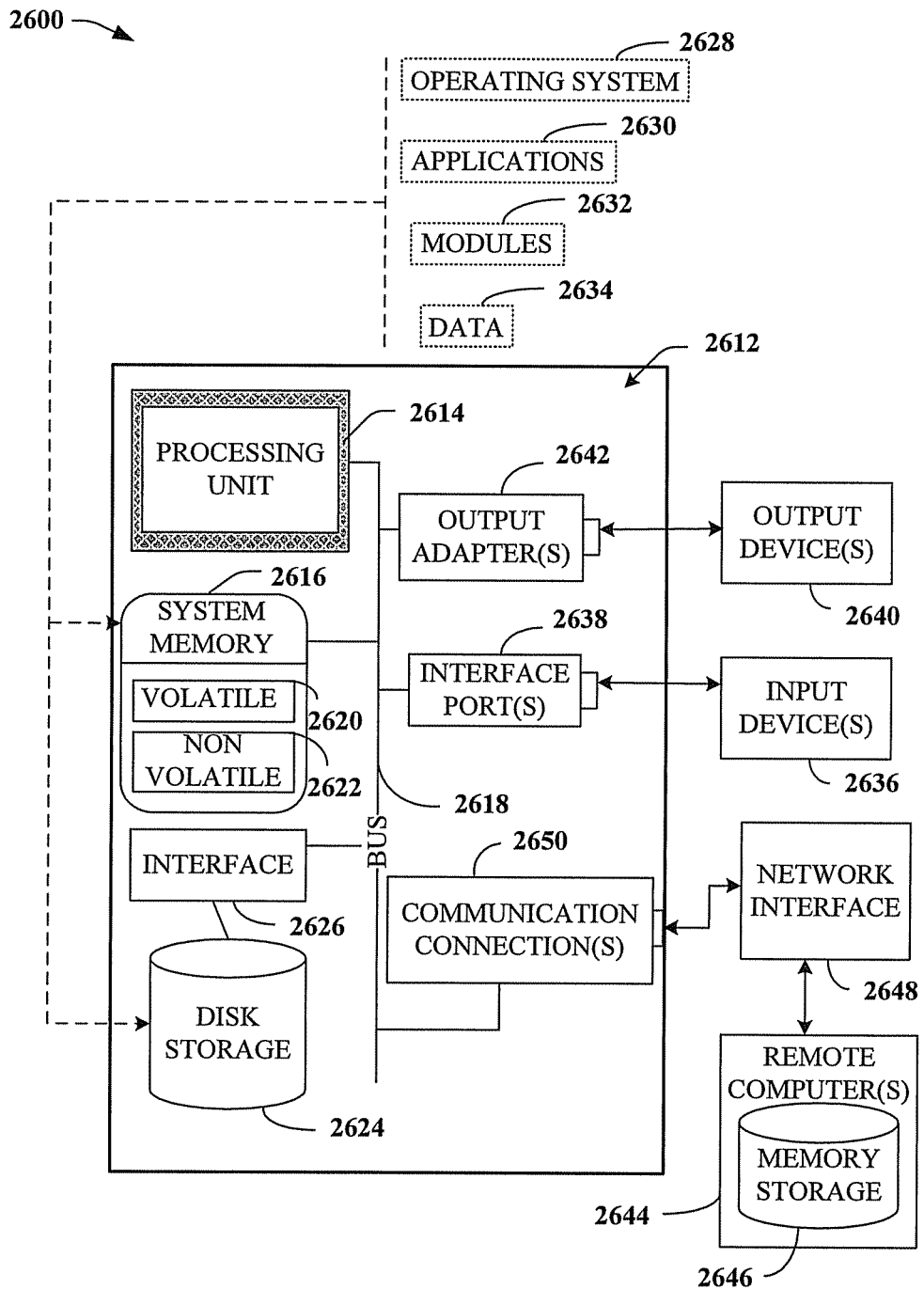
FIG. 26 illustrates a block diagram of a computer operable to execute the disclosed methods and apparatus, in accordance with an embodiment.
Figure 27:
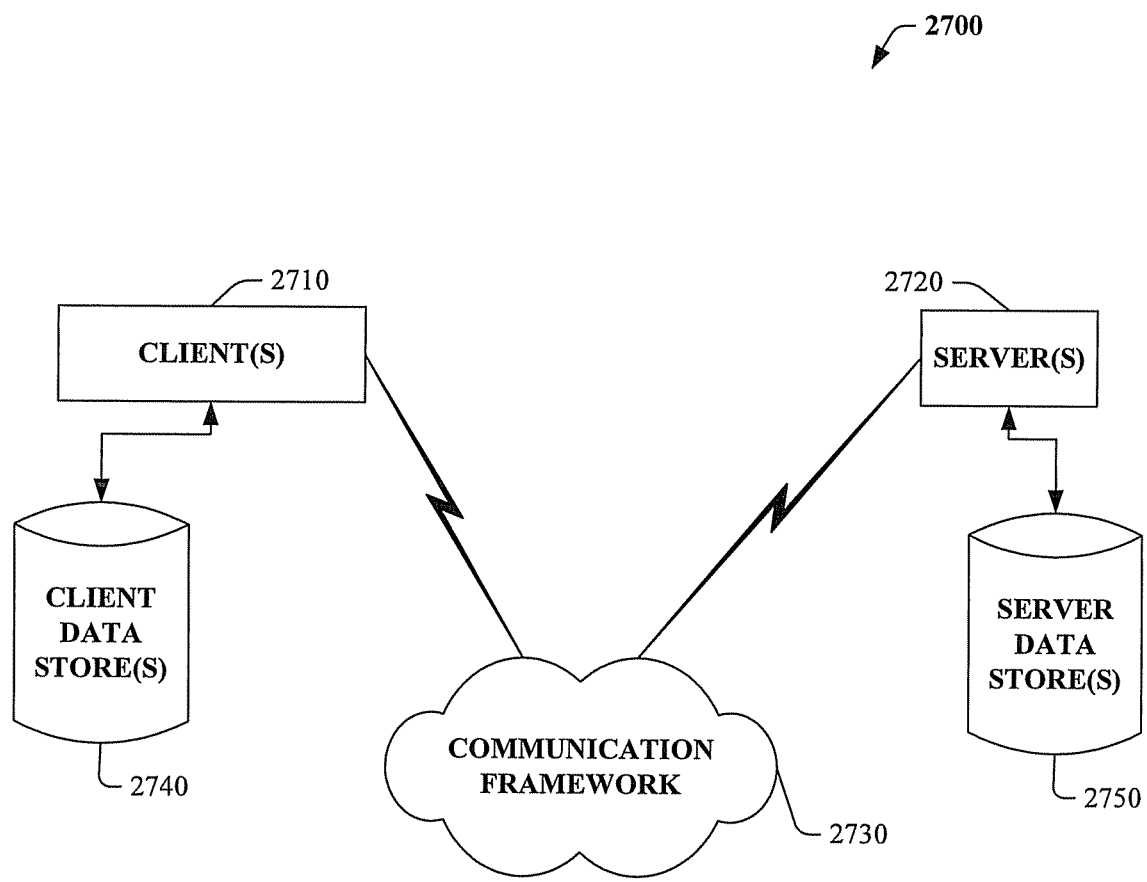
FIG. 27 illustrates a schematic block diagram of an exemplary computing environment, in accordance with an embodiment.

In order to provide a context for the various aspects of the disclosed subject matter, FIGS. 26 and 27, as well as the following discussion, are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types.

Moreover, those skilled in the art will appreciate that the inventive systems may be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects may also be practiced in distributed computing environments where tasks are performed by remote processing devices that are linked through a communications network; however, some if not all aspects of the subject disclosure can be practiced on stand-alone computers. In a distributed computing environment, program modules may be located in both local and remote memory storage devices.

With reference to FIG. 26, a block diagram of a computer 2600 operable to execute the disclosed systems and methods, in accordance with an embodiment, includes a computer 2612. The computer 2612 includes a processing unit 2614, a system memory 2616, and a system bus 2618. The system bus 2618 couples system components including, but not limited to, the system memory 2616 to the processing unit 2614. The processing unit 2614 can be any of various available processors. Dual microprocessors and other multiprocessor architectures also can be employed as the processing unit 2614.

The system bus 2618 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

The system memory 2616 includes volatile memory 2620 and nonvolatile memory 2622. The basic input/output system (BIOS), containing the basic routines to transfer information between elements within the computer 2612, such as during start-up, is stored in nonvolatile memory 2622. By way of illustration, and not limitation, nonvolatile memory 2622 can include ROM, PROM, EPROM, EEPROM, or flash memory. Volatile memory 2620 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 2612 also includes removable/non-removable, volatile/non-volatile computer storage media. FIG. 26 illustrates, for example, disk storage 2624. Disk storage 2624 includes, but is not limited to, devices like a magnetic disk drive, floppy disk drive, tape drive, Jaz drive, Zip drive, LS-100 drive, flash memory card, or memory stick. In addition, disk storage 2624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2624 to the system bus 2618, a removable or non-removable interface is typically used, such as interface 2626.

It is to be appreciated that FIG. 26 describes software that acts as an intermediary between users and the basic computer resources described in the suitable operating environment 2600. Such software includes an operating system 2628. Operating system 2628, which can be stored on disk storage 2624, acts to control and allocate resources of the computer system 2612. System applications 2630 take advantage of the management of resources by operating system 2628 through program modules 2632 and program data 2634 stored either in system memory 2616 or on disk storage 2624. It is to be appreciated that the disclosed subject matter can be implemented with various operating systems or combinations of operating systems.

A user enters commands or information into the computer 2611 through input device(s) 2636. Input devices 2636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2614 through the system bus 2618 via interface port(s) 2638. Interface port(s) 2638 include, for example, a serial port, a parallel port, a game port, and a universal serial bus (USB). Output device(s) 2640 use some of the same type of ports as input device(s) 2636.

Thus, for example, a USB port may be used to provide input to computer 2612, and to output information from computer 2612 to an output device 2640. Output adapter 2642 is provided to illustrate that there are some output devices 2640 like monitors, speakers, and printers, among other output devices 2640, which use special adapters. The output adapters 2642 include, by way of illustration and not limitation, video and sound cards that provide a means of connection between the output device 2640 and the system bus 2618. It should be noted that other devices and/or systems of devices provide both input and output capabilities such as remote computer(s) 2644.

Computer 2612 can operate in a networked environment using logical connections to one or more remote computers, such as remote computer(s) 2644. The remote computer(s) 2644 can be a personal computer, a server, a router, a network PC, a workstation, a microprocessor based appliance, a peer device or other common network node and the like, and typically includes many or all of the elements described relative to computer 2612.

For purposes of brevity, only a memory storage device 2646 is illustrated with remote computer(s) 2644. Remote computer(s) 2644 is logically connected to computer 2612 through a network interface 2648 and then physically connected via communication connection 2650. Network interface 2648 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2650 refer(s) to the hardware/software employed to connect the network interface 2648 to the bus 2618. While communication connection 2650 is shown for illustrative clarity inside computer 2612, it can also be external to computer 2612. The hardware/software for connection to the network interface 2648 can include, for exemplary purposes only, internal and external technologies such as, modems including regular telephone grade modems, cable modems and DSL modems, ISDN adapters, and Ethernet cards.

FIG. 27 illustrates a schematic block diagram of an exemplary computing environment 2730, in accordance with an embodiment. The system 2700 includes one or more client(s) 2710. The client(s) 2710 can be hardware and/or software (e.g., threads, processes, computing devices). The system 2700 also includes one or more server(s) 2720. Thus, system 2700 can correspond to a two-tier client server model or a multi-tier model (e.g., client, middle tier server, data server), amongst other models. The server(s) 2720 can also be hardware and/or software (e.g., threads, processes, computing devices). The servers 2720 can house threads to perform transformations by employing the subject innovation, for example. One possible communication between a client 2710 and a server 2720 may be in the form of a data packet transmitted between two or more computer processes.

The system 2700 includes a communication framework 2730 that can be employed to facilitate communications between the client(s) 2710 and the server(s) 2720. The client(s) 2710 are operatively connected to one or more client data store(s) 2740 that can be employed to store information local to the client(s) 2710. Similarly, the server(s) 2720 are operatively connected to one or more server data store(s) 2750 that can be employed to store information local to the servers 2720.

The above description of illustrated embodiments of the subject disclosure, including what is described in the Abstract, is not intended to be exhaustive or to limit the disclosed embodiments to the precise forms disclosed. While specific embodiments of, and examples for, the invention are described herein for illustrative purposes, various modifications are possible within the scope of the invention, as those skilled in the relevant art should recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A system comprising:
   a memory to store instructions; and
   a processor, coupled to the memory, that facilitates execution of the instructions to perform operations, comprising:
      receiving a data table that associates a first identifier of an asynchronous transfer mode port with a second identifier of a base station device, wherein the asynchronous transfer mode port has been coupled, via a physical transmission link, to a radio network controller device and the base station device;
      creating, based on the data table, a script comprising other instructions to query for information of the base station device;
      in response to determining, using the script, that another physical transmission link has been coupled to the base station device via the asynchronous transfer mode port, generating configuration data for an asynchronous transfer mode line card device coupled to the other physical transmission link; and
      configuring, based on the configuration data, the asynchronous transfer mode line card device to utilize an increase in capacity of the asynchronous transfer mode port.

2. The system of claim 1, wherein the configuring comprises determining whether the capacity of the asynchronous transfer mode port was modified within a predetermined period of time.

3. The system of claim 1, wherein the operations further comprise determining whether the base station device was configured within a predetermined period of time.

4. The system of claim 1, wherein the operations further comprise generating a descriptor that defines traffic characteristics of a virtual path associated with the increase in the capacity of the asynchronous transfer mode port, wherein the virtual path comprises virtual circuits associated with endpoints.

5. The system of claim 4, wherein the operations further comprise creating a virtual circuit of the virtual circuits that represents a sub-bandwidth of a bandwidth of the asynchronous transfer mode port.

6. The system of claim 4, wherein the operations further comprise creating an asynchronous transfer mode adaptation layer path for a virtual circuit of the virtual circuits.

7. The system of claim 1, wherein the operations further comprise:
   determining the capacity of the asynchronous transfer mode port to obtain a determined capacity; and configuring, according to the determined capacity, the radio network controller device.

8. The system of claim 1, wherein the operations further comprise:
configuring another asynchronous transfer mode port based on the increase in the capacity; and
including the other asynchronous transfer mode port in an inverse multiplexing for an asynchronous transfer mode group.

9. The system of claim 1, wherein the radio network controller device comprises the memory and the processor.

10. The system of claim 1, wherein the base station device comprises the memory and the processor.

11. A method, comprising:
polling, by a system comprising a processor, data utilizing a script that references a first identifier of an asynchronous transfer mode port and a second identifier of a base station device, wherein the asynchronous transfer mode port has been coupled, via a transmission line, to a radio network controller device and the base station device;
in response to determining, by the system based on the data, that another transmission line has been coupled to the base station device via the asynchronous transfer mode port, creating configuration data for a device coupled to the other transmission line; and
configuring, by the system based on the configuration data, the device coupled to the other transmission line.

12. The method of claim 11, further comprising generating, by the system, a descriptor that defines traffic characteristics of a virtual path associated with the other transmission line, wherein the virtual path comprises virtual circuits associated with endpoints.

13. The method of claim 11, further comprising adding, by the system, the asynchronous transfer mode port to an inverse multiplexing for asynchronous transfer mode group.

14. The method of claim 13, further comprising configuring, by the system, an inverse multiplexing for asynchronous transfer mode link associated with the inverse multiplexing for asynchronous transfer mode group.

15. The method of claim 11, further comprising modifying, by the system, a configuration of the base station device based on the configuration data.

16. A tangible computer-readable storage medium comprising computer-executable instructions that, in response to execution, cause a computing system comprising a processor to perform operations, comprising:
in response to receiving information associated with a cellular wireless network, creating, based on the information, a script referencing a port identifier of an asynchronous transfer mode port and a base station identifier of a base station device, wherein the asynchronous transfer mode port has been coupled, via a transmission link, to a radio network controller device and the base station device;
in response to identifying that another transmission link has been coupled to the base station device via the asynchronous transfer mode port,
generating data for configuration of an asynchronous transfer mode line card device coupled to the other transmission link; and
configuring the asynchronous transfer mode line card device based on the data.

17. The tangible computer-readable storage medium of claim 16, wherein the operations further comprise determining whether the configuration of the asynchronous transfer mode line card device was modified within a predetermined period of time.

18. The tangible computer-readable storage medium of claim 16, wherein the operations further comprise determining whether the base station device was configured according to the data within a predetermined period of time.

19. The tangible computer-readable storage medium of claim 16, wherein the operations further comprise, in response to the generating the data, creating a descriptor representing a characteristic of a virtual path comprising a virtual circuit, wherein the virtual circuit represents a portion of a bandwidth of the asynchronous transfer mode port.

20. The tangible computer-readable storage medium of claim 19, wherein the operations further comprise creating an asynchronous transfer mode adaptation layer path for the virtual circuit.

* * * * *